US012272031B2

(12) United States Patent
Singh et al.

(10) Patent No.: US 12,272,031 B2
(45) Date of Patent: Apr. 8, 2025

(54) DIVERSE IMAGE INPAINTING USING CONTRASTIVE LEARNING

(71) Applicant: Adobe Inc., San Jose, CA (US)

(72) Inventors: Krishna Kumar Singh, San Jose, CA (US); Yuheng Li, Madison, WI (US); Yijun Li, Seattle, WA (US); Jingwan Lu, Sunnyvale, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 390 days.

(21) Appl. No.: 17/725,818

(22) Filed: Apr. 21, 2022

(65) Prior Publication Data

US 2023/0342884 A1    Oct. 26, 2023

(51) Int. Cl.
*G06T 5/70* (2024.01)
*G06N 3/045* (2023.01)
*G06T 5/77* (2024.01)
*G06V 10/74* (2022.01)
*G06V 10/82* (2022.01)

(52) U.S. Cl.
CPC ............ *G06T 5/70* (2024.01); *G06N 3/045* (2023.01); *G06V 10/761* (2022.01); *G06V 10/82* (2022.01); *G06T 2207/20081* (2013.01)

(58) Field of Classification Search
None
See application file for complete search history.

(56) References Cited

U.S. PATENT DOCUMENTS

| 11,720,994 B2* | 8/2023 | Luo ................. G06T 11/00 345/648 |
| 2022/0284646 A1* | 9/2022 | Saha ................. G06T 7/10 |
| 2023/0146676 A1* | 5/2023 | Liu ................. G06T 11/60 382/157 |

OTHER PUBLICATIONS

Singh, Krishna Kumar, Utkarsh Ojha, and Yong Jae Lee. "FineGAN: Unsupervised Hierarchical Disentanglement for Fine-Grained Object Generation and Discovery." 2019 IEEE/CVF Conference on Computer Vision and Pattern Recognition (CVPR). IEEE, 2019. 6483-6492. Web. (Year: 2019).*

(Continued)

*Primary Examiner* — Amandeep Saini
*Assistant Examiner* — Caroline Tabancay Duffy
(74) *Attorney, Agent, or Firm* — FIG. 1 Patents

(57) ABSTRACT

An image inpainting system is described that receives an input image that includes a masked region. From the input image, the image inpainting system generates a synthesized image that depicts an object in the masked region by selecting a first code that represents a known factor characterizing a visual appearance of the object and a second code that represents an unknown factor characterizing the visual appearance of the object apart from the known factor in latent space. The input image, the first code, and the second code are provided as input to a generative adversarial network that is trained to generate the synthesized image using contrastive losses. Different synthesized images are generated from the same input image using different combinations of first and second codes, and the synthesized images are output for display.

20 Claims, 14 Drawing Sheets
(6 of 14 Drawing Sheet(s) Filed in Color)

(56) References Cited

OTHER PUBLICATIONS

L. Zhao et al., "UCTGAN: Diverse Image Inpainting Based on Unsupervised Cross-Space Translation," 2020 IEEE/CVF Conference on Computer Vision and Pattern Recognition (CVPR), Seattle, WA, USA, 2020, pp. 5740-5749, doi: 10.1109/CVPR42600.2020. 00578. (Year: 2020).*
Deng et al., "Disentangled and Controllable Face Image Generation via 3D Imitative-Contrastive Learning." N.p., 2020. Web. (Year: 2020).*
Liu, H., Wan, Z., Huang, W., Song, Y., Han, X., & Liao, J. (2021). PD-GAN: Probabilistic Diverse GAN for Image Inpainting. 2021 IEEE/CVF Conference on Computer Vision and Pattern Recognition (CVPR), 9367-9376. https://doi.org/10.1109/CVPR46437.2021. 00925 (Year: 2021).*
Zheng, H., Lin, Z., Lu, J., Cohen, S., Shechtman, E., Barnes, C., Zhang, J., Xu, N., Amirghodsi, S., & Luo, J. (2022). CM-GAN: Image Inpainting with Cascaded Modulation GAN and Object-Aware Training. arXiv.Org. (Year: 2022).*
"Face-parsing.PyTorch", GitHub, Inc., Uploaded by zllrunning [retrieved Jan. 26, 2022]. Retrieved from the Internet <https://github.com/zllrunning/face-parsing.pytorch>., 2019, 4 Pages.
Ballester, C et al., "Filling-in by joint interpolation of vector fields and gray levels", IEEE transactions on image processing, vol. 10, issue 8 [retrieved Jan. 26, 2022]. Retrieved from the Internet <https://www.maths.univ-evry.fr/pages_perso/vtorri/files/UV/unpaint/filling_in.pdf>., Apr. 2, 2001, 30 pages.
Barnes, Connelly et al., "PatchMatch: A Randomized Correspondence Algorithm for Structural Image Editing", ACM SIGGRAPH 2009 Papers (New Orleans, Louisiana, Aug. 3-7, 2009) [retrieved Jan. 26, 2022]. Retrieved from the Internet <https://faculty.idc.ac.il/arik/seminar2009/papers/patchMatch.pdf>., Aug. 3, 2009, 10 pages.
Bertalmio, Marcelo et al., "Image Inpainting", SIGGRAPH '00: Proceedings of the 2ih annual conference on computer graphics and interactive techniques [retrieved Jan. 26, 2022]. Retrieved from the Internet <http://graphics.hallym.ac.kr/teach/2009/tcg/src/SIG00Ber.pdf>., 2000, 8 pages.
Chen, Ting et al., "A Simple Framework for Contrastive Learning of Visual Representations", Cornell University arXiv, arXiv.org [retrieved Jan. 26, 2022]. Retrieved from the Internet <https://arxiv.org/pdf/2002.05709.pdf>., Jul. 1, 2020, 20 Pages.
Deng, Jiankang et al., "ArcFace: Additive Angular Margin Loss for Deep Face Recognition", Cornell University arXiv, arXiv.org [retrieved Feb. 17, 2022]. Retrieved from the Internet <https://arxiv.org/pdf/1801.07698.pdf>., Feb. 2019, 11 pages.
Denton, Emily et al., "Unsupervised Learning of Disentangled Representations from Video", Cornell University arXiv, arXiv.org [retrieved Jan. 26, 2022]. Retrieved from the Internet <https://arxiv.org/pdf/1705.10915.pdf>., May 31, 2017, 13 pages.
Ding, Ding et al., "Image Inpainting Using Nonlocal Texture Matching and Nonlinear Filtering", IEEE Transactions on Image Processing, vol. 28, No. 4 [retrieved Jan. 26, 2022]. Retrieved from the Internet <https://www.csd.uoc.gr/~hy371/bibliography/InpaintingNonlocalTexture.pdf>., Nov. 28, 2018, 15 Pages.
Du, Ruoyi et al., "Fine-Grained Visual Classification via Progressive Multi-granularity Training of Jigsaw Patches", Cornell University arXiv, arXiv.org [retrieved Jan. 26, 2022]. Retrieved from the Internet <https://arxiv.org/pdf/2003.03836.pdf>., Jul. 19, 2020, 15 Pages.
Goodfellow, Ian J. et al., "Generative Adversarial Nets", In: Advances in neural information processing systems (2014) [retrieved Jan. 17, 2022]. Retrieved from the Internet <https://www.cs.utah.edu/~zhe/teach/archived/2019f/6190-pdf/gans.pdf>., Jun. 10, 2014, 9 pages.
Guo, Xiefan et al., "Image Inpainting via Conditional Texture and Structure Dual Generation", Proceedings of the IEEE/CVF International Conference on Computer Vision (ICCV) [retrieved Jan. 26, 2022]. Retrieved from the Internet <https://openaccess.thecvf.com/content/ICCV2021/supplemental/Guo_Image_Inpainting_via_ICCV_2021_supplemental.pdf>., Aug. 22, 2021, 10 Pages.

Harkönen, Erik et al., "GANSpace: Discovering Interpretable GAN Controls", Cornell University arXiv, arXiv.org [retrieved Jan. 27, 2022]. Retrieved from the Internet <https://arxiv.org/pdf/2004.02546.pdf>., Dec. 14, 2020, 29 Pages.
Hays, James et al., "Scene Completion Using Millions of Photographs", ACM SIGGRAPH, vol. 26 [retrieved Jan. 27, 2022]. Retrieved from the Internet <https://core.ac.uk/download/pdf/204757325.pdf>., Jul. 2007, 7 pages.
He, Kaiming et al., "Mask R-CNN", Cornell University arXiv, arXiv.org [retrieved Jan. 26, 2022]. Retrieved from the Internet <https://arxiv.org/pdf/1703.06870.pdf>., Jan. 24, 2018, 12 pages.
He, Kaiming et al., "Momentum Contrast for Unsupervised Visual Representation Learning", Proceedings of the IEEE/CVF Conference on Computer Vision and Pattern Recognition (CVPR) [retrieved Jan. 27, 2022]. Retrieved from the Internet <https://static.aminer.cn/upload/pdf/455/540/1920/5dcd263a3a55ac58039516c5_1.pdf>., Mar. 23, 2020, 12 Pages.
Heusel, Martin et al., "GANs Trained by a Two Time-Scale Update Rule Converge to a Local Nash Equilibrium", NIPS'17: Proceedings of the 31st International Conference on Neural Information Processing Systems [retrieved Feb. 17, 2022]. Retrieved from the Internet <https://proceedings.neurips.cc/paper/2017/file/8a1d694707eb0fefe65871369074926d-Paper.pdf>., Jan. 12, 2018, 12 pages.
Huang, Yuge et al., "CurricularFace: Adaptive Curriculum Learning Loss for Deep Face Recognition", Cornell University arXiv, arXiv.org [retrieved Jan. 27, 2022]. Retrieved from the Internet <https://arxiv.org/pdf/2004.00288.pdf>., Apr. 1, 2020, 10 Pages.
Iizuka, Satoshi et al., "Globally and Locally Consistent Image Completion", ACM Transactions on Graphics, vol. 36, No. 4 [retrieved Jan. 27, 2022]. Retrieved from the Internet <https://openreview.net/pdf?id=wUq6DdbM6M>., Jul. 20, 2017, 13 pages.
Jahanian, Ali et al., "On the "steerability" of generative adversarial networks", Cornell University arXiv, arXiv.org [retrieved Jan. 27, 2022]. Retrieved from the Internet <https://arxiv.org/pdf/1907.07171.pdf>., Feb. 17, 2020, 31 Pages.
Karras, Tero et al., "A Style-Based Generator Architecture for Generative Adversarial Networks", Cornell University arXiv, arXiv.org [retrieved Feb. 17, 2022]. Retrieved from the Internet <https://arxiv.org/pdf/1812.04948.pdf>., Mar. 29, 2019, 12 pages.
Karras, Tero et al., "Analyzing and Improving the Image Quality of StyleGAN", Cornell University arXiv, arXiv.org [retrieved Feb. 17, 2022]. retrieved from the Internet <https://arxiv.org/pdf/1912.04958.pdf>., Dec. 2019, 21 Pages.
Kingma, Diederik P. et al., "Auto-Encoding Variational Bayes", Cornell University arXiv, arXiv.org [retrieved Jan. 27, 2022]. Retrieved from the Internet <https://arxiv.org/pdf/1312.6114.pdf>., May 1, 2014, 14 Pages.
Krause, Jonathan et al., "3D Object Representations for Fine-Grained Categorization", 4th IEEE Workshop on 3D Representation and Recognition, at ICCV 2013 (3dRR-13) [retrieved Jan. 26, 2022]. Retrieved from the Internet <http://vision.stanford.edu/pdf/3drr13.pdf>., Dec. 8, 2013, 8 pages.
Lee, Cheng-Han et al., "MaskGAN: Towards Diverse and Interactive Facial Image Manipulation", Cornell University arXiv, arXiv.org [retrieved Feb. 3, 2022]. Retrieved from the Internet <https://arxiv.org/pdf/1907.11922.pdf>., Apr. 1, 2020, 20 Pages.
Li, Yuheng et al., "Collaging Class-Specific GANs for Semantic Image Synthesis", Cornell University arXiv, arXiv.org [retrieved Jan. 26, 2022]. Retrieved from the Internet <https://arxiv.org/pdf/2110.04281.pdf>., Oct. 2021, 31 Pages.
Li, Yuheng et al., "MixNMatch: Multifactor Disentanglement and Encoding for Conditional Image Generation", Cornell University arXiv, arXiv.org [retrieved Jan. 27, 2022]. Retrieved from the Internet <Cornell University arXiv, arXiv.org [retrieved Jan. 27, 2022]. Retrieved from the Internet>., Apr. 13, 2020, 16 Pages.
Liu, Guilin et al., "Image Inpainting for Irregular Holes Using Partial Convolutions", Cornell University arXiv, arXiv.org [retrieved Feb. 3, 2022]. Retrieved from the Internet <https://arxiv.org/pdf/1804.07723.pdf>., Dec. 15, 2018, 23 Pages.
Ma, Xin et al., "Free-Form Image Inpainting via Contrastive Attention Network", Cornell University arXiv, arXiv.org [retrieved Jan.

(56) References Cited

OTHER PUBLICATIONS 27, 2022]. Retrieved from the Internet <https://arxiv.org/pdf/2010.15643.pdf>., Oct. 29, 2020, 8 Pages.

Misra, Ishan et al., "Self-Supervised Learning of Pretext-Invariant Representations", Cornell University arXiv, arXiv.org [retrieved Jan. 26, 2022]. Retrieved from the Internet <https://arxiv.org/pdf/1912.01991.pdf>., Dec. 4, 2019, 14 Pages.

Nataraj, Lakshmanan et al., "Detecting GAN generated Fake Images using Co-occurrence Matrices", Cornell University arXiv, arXiv.org [retrieved Jan. 27, 2022]. Retrieved from the Internet <https://arxiv.org/pdf/1903.06836.pdf>., Oct. 3, 2019, 6 Pages.

Park, Taesung et al., "Contrastive Learning for Unpaired Image-to-Image Translation", Cornell University arXiv, arXiv.org [retrieved Jan. 27, 2022]. Retrieved from the Internet <https://arxiv.org/pdf/2007.15651.pdf>., Aug. 20, 2020, 29 Pages.

Pathak, Deepak et al., "Context Encoders: Feature Learning by Inpainting", Cornell University arXiv, arXiv.org [retrieved Jan. 25, 2022]. Retrieved from the Internet <https://arxiv.org/pdf/1604.07379.pdf>., Nov. 21, 2016, 12 pages.

Ren, Yurui et al., "StructureFlow: Image Inpainting via Structure-Aware Appearance Flow", Cornell University arXiv, arXiv.org [retrieved Jan. 27, 2022]. Retrieved from the Internet <https://arxiv.org/pdf/1908.03852.pdf>., Aug. 11, 2019, 10 Pages.

Richardson, Elad et al., "Encoding in Style: A StyleGAN Encoder for Image-to-Image Translation", Cornell University arXiv, arXiv.org [retrieved Feb. 17, 2022]. Retrieved from the Internet <https://arxiv.org/pdf/2008.00951.pdf>., Aug. 2020, 21 Pages.

Sagong, Min-Cheol et al., "PEPSI : Fast Image Inpainting With Parallel Decoding Network", Proceedings of the IEEE/CVF CVPR [retrieved Jan. 27, 2022]. Retrieved from the Internet <https://openaccess.thecvf.com/content_CVPR_2019/papers/Sagong_PEPSI_Fast_Image_Inpainting_With_Parallel_Decoding_Network_CVPR_2019_paper.pdf>., Jun. 2019, 9 Pages.

Shen, Yujun , "Closed-Form Factorization of Latent Semantics in GANs", Cornell University arXiv, arXiv.org [retrieved Jan. 27, 2022]. Retrieved from the Internet <https://arxiv.org/pdf/2007.06600.pdf>., Apr. 3, 2021, 9 Pages.

Shen, Yujun et al., "InterFaceGAN: Interpreting the Disentangled Face Representation Learned by GANs", Cornell University arXiv, arXiv.org [retrieved Jan. 26, 2022]. Retrieved from the Internet <https://arxiv.org/pdf/2005.09635.pdf>., Oct. 29, 2020, 16 Pages.

Shen, Yujun et al., "Interpreting the Latent Space of GANs for Semantic Face Editing", Cornell University arXiv, arXiv.org [retrieved Jan. 26, 2022]. Retrieved from the Internet <https://arxiv.org/pdf/1907.10786.pdf>., Nov. 26, 2019, 20 pages.

Shu, Zhixin et al., "Deforming Autoencoders: Unsupervised Disentangling of Shape and Appearance", Cornell University arXiv, arXiv.org [retrieved Jan. 27, 2022]. Retrieved from the Internet <https://arxiv.org/pdf/1806.06503.pdf>., Jun. 18, 2018, 29 Pages.

Simonyan, Karen et al., "Very Deep Convolutional Networks for Large-Scale Image Recognition", arXiv Preprint, Cornell University, arXiv.org [retrieved Feb. 24, 2022]. Retrieved from the Internet <https://arxiv.org/pdf/1409.1556.pdf>., Sep. 2014, 14 pages.

Singh, Krishna K. et al., "FineGAN: Unsupervised Hierarchical Disentanglement for Fine-Grained Object Generation and Discovery", Cornell University arXiv, arXiv.org [retrieved Jan. 27, 2022]. Retrieved from the Internet <https://arxiv.org/pdf/1811.11155.pdf>., Apr. 9, 2019, 18 Pages.

Suin, Maitreya et al., "Distillation-Guided Image Inpainting", Proceedings of the IEEE/CVF International Conference on Computer Vision (ICCV) [retrieved Jan. 27, 2022]. Retrieved from the Internet <https://openaccess.thecvf.com/content/ICCV2021/papers/Suin_Distillation-Guided_Image_Inpainting_ICCV_2021_paper.pdf>., 2021, 10 Pages.

Telea, Alexandru , "An Image Inpainting Technique Based on the Fast Marching Method", Journal of Graphics Tools [retrieved Jan. 27, 2022]. Retrieved from the Internet <http://citeseerx.ist.psu.edu/viewdoc/download?doi=10.1.1.98.5505&rep=rep1&type=pdf>., 2004, 12 Pages.

Tian, Yonglong et al., "Contrastive Multiview Coding", Cornell University arXiv, arXiv.org [retrieved Jan. 27, 2022]. Retrieved from the Internet <https://arxiv.org/pdf/1906.05849.pdf>., Dec. 18, 2020, 16 Pages.

Voynov, Andrey et al., "Unsupervised Discovery of Interpretable Directions in the GAN Latent Space", Cornell University arXiv, arXiv.org [retrieved Jan. 27, 2022]. Retrieved from the Internet <https://arxiv.org/pdf/2002.03754.pdf>., Jun. 24, 2020, 15 Pages.

Wah, Catherine et al., "The Caltech-UCSD Birds-200-2011 Dataset", California Institute of Technology [retrieved Jan. 27, 2022]. Retrieved from the Internet <https://core.ac.uk/download/pdf/4892191.pdf>., Oct. 2011, 8 pages.

Wan, Ziyu et al., "High-Fidelity Pluralistic Image Completion with Transformers", Cornell University arXiv, arXiv.org [retrieved Feb. 3, 2022]. Retrieved from the Internet <https://arxiv.org/pdf/2103.14031.pdf>., Mar. 25, 2021, 10 Pages.

Wang, Sheng-Yu et al., "Cnn-generated images are surprisingly easy to spot . . . for now", Cornell University arXiv, arXiv.org [retrieved Jan. 27, 2022]. Retrieved from the Internet <https://arxiv.org/pdf/1912.11035.pdf>., Apr. 4, 2020, 13 Pages.

Wang, Yi et al., "Image Inpainting via Generative Multi-column Convolutional Neural Networks", Cornell University arXiv, arXiv.org [retrieved Jan. 27, 2022]. Retrieved from the Internet <https://arxiv.org/pdf/1810.08771.pdf>., Oct. 20, 2018, 10 Pages.

Wu, Yuxin et al., "Detectron2", GitHub, Inc., Uploaded by facebookresearch [retrieved Jan. 26, 2022]. Retrieved from the Internet <https://github.com/facebookresearch/detectron2>., 2019, 4 Pages.

Xie, Chaohao et al., "Image Inpainting With Learnable Bidirectional Attention Maps", Cornell University arXiv, arXiv.org [retrieved Jan. 27, 2022]. Retrieved from the Internet <https://arxiv.org/pdf/1909.00968.pdf>., Sep. 5, 2019, 18 Pages.

Xing, Xianglei et al., "Deformable Generator Network: Unsupervised Disentanglement of Appearance and Geometry", Cornell University arXiv, arXiv.org [retrieved Jan. 27, 2022]. Retrieved from the Internet <https://arxiv.org/pdf/1806.06298.pdf>., Jan. 14, 2020, 17 Pages.

Xiong, Wei et al., "Foreground-Aware Image Inpainting", Cornell University arXiv, arXiv.org [retrieved Jan. 27, 2022]. Retrieved from the Internet <https://arxiv.org/pdf/1901.05945.pdf>., Apr. 22, 2019, 12 Pages.

Yan, Zhaoyi et al., "Shift-Net: Image Inpainting via Deep Feature Rearrangement", Cornell University arXiv, arXiv.org [retrieved Jan. 27, 2022]. Retrieved from the Internet <https://arxiv.org/pdf/1801.09392.pdf>., Apr. 13, 2018, 25 Pages.

Yang, Ceyuan et al., "Semantic Hierarchy Emerges in Deep Generative Representations for Scene Synthesis", Cornell University arXiv, arXiv.org [retrieved Jan. 27, 2022]. Retrieved from the Internet <https://arxiv.org/pdf/1911.09267.pdf>., Feb. 11, 2020, 15 Pages.

Yang, Chao , "High-Resolution Image Inpainting using Multi-Scale Neural Patch Synthesis", Cornell University, arXiv Preprint, arXiv.org [retrieved Oct. 27, 2021]. Retrieved from the Internet <https://arxiv.org/pdf/1611.09969>., Apr. 13, 2017, 9 pages.

Yu, Fisher et al., "LSUN: Construction of a Large-Scale Image Dataset using Deep Learning with Humans in the Loop", Cornell University arXiv, arXiv.org [retrieved Jan. 26, 2022]. Retrieved from the Internet <https://arxiv.org/pdf/1506.03365.pdf>., Jun. 4, 2016, 9 pages.

Yu, Jiahui et al., "Free-Form Image Inpainting With Gated Convolution", Cornell University arXiv, arXiv.org [retrieved Feb. 3, 2022]. Retrieved from the Internet <https://arxiv.org/pdf/1806.03589.pdf>., Oct. 22, 2019, 17 Pages.

Yu, Yingchen et al., "Diverse Image Inpainting with Bidirectional and Autoregressive Transformers", Cornell University arXiv, arXiv.org [retrieved Feb. 3, 2022]. Retrieved from the Internet <https://arxiv.org/pdf/2104.12335.pdf>., Jun. 1, 2021, 11 Pages.

Zeng, Yanhong et al., "Learning Pyramid-Context Encoder Network for High-Quality Image Inpainting", Cornell University arXiv, arXiv.org [retrieved Jan. 27, 2022]. Retrieved from the Internet <https://arxiv.org/pdf/1904.07475.pdf>., Jul. 11, 2019, 14 Pages.

Zhang, Richard et al., "The Unreasonable Effectiveness of Deep Features as a Perceptual Metric", Cornell University arXiv, arXiv.

(56) References Cited

OTHER PUBLICATIONS org [retrieved Feb. 17, 2022]. Retrieved from the Internet <https://arxiv.org/pdf/1801.03924.pdf>., Apr. 10, 2018, 14 Pages.

Zhao, Lei et al., "UCTGAN: Diverse Image Inpainting Based on Unsupervised Cross-Space Translation", Proceedings of the IEEE/CVF (CVPR) [retrieved Jan. 27, 2022]. Retrieved from the Internet <https://openaccess.thecvf.com/content_CVPR_2020/papers/Zhao_UCTGAN_Diverse_Image_Inpainting_Based_on_Unsupervised_Cross-Space_Translation_CVPR_2020_paper.pdf>., 10 Pages.

Zhao, Shengyu et al., "Large Scale Image Completion via Co-Modulated Generative Adversarial Networks", Cornell University arXiv, arXiv.org [retrieved Jan. 26, 2022]. Retrieved from the Internet <https://arxiv.org/pdf/2103.10428.pdf>., Sep. 28, 2020, 25 Pages.

Zhou, Xiaoqiang et al., "Image Inpainting with Contrastive Relation Network", 2020 25th International Conference on Pattern Recognition (ICPR) [retrieved May 24, 2022]. Retrieved from the Internet <https://doi.org/10.1109/ICPR48806.2021.9412640>., Jan. 2021, 8 pages.

Zhuang, Chengxu et al., "Local Aggregation for Unsupervised Learning of Visual Embeddings", Cornell University arXiv, arXiv.org [retrieved Jan. 27, 2022]. Retrieved from the Internet <https://arxiv.org/pdf/1903.12355.pdf>., Apr. 10, 2019, 13 Pages.

\* cited by examiner

DIVERSE IMAGE INPAINTING USING CONTRASTIVE LEARNING

BACKGROUND

In digital image generation, inpainting refers to the task of reconstructing one or more missing regions in an image. Image inpainting is an essential function in a range of digital imaging and graphics applications, such as image restoration, compositing, manipulation, and so forth. Conventional image inpainting approaches, however, are unable to generate visually diverse results and fail to offer explicit control over discrete factors that contribute to visual variation. For instance, in an implementation where image inpainting is used to fill in a human face region of an image, conventional approaches are unable to explicitly control factors contributing to facial identity, facial expression, and so forth. Further, conventional image inpainting approaches often reconstruct missing image regions as having an inferior image quality relative to existing image regions.

SUMMARY

An image inpainting system implements an image inpainting model to generate diverse synthesized images from a masked input image. The image inpainting system enables control over the visual appearance of an object depicted in each synthesized image using two latent space codes, with one of the two latent space codes representing a known characteristic of an object's visual appearance and the other latent space code representing the object's visual appearance apart from the known characteristic. To ensure that the different combinations of latent space codes depict visually diverse objects, the diverse image inpainting model is trained using two contrastive losses—one contrastive loss for each of the disentangled latent spaces represented by the respective latent space codes.

The diverse image inpainting model is configured as a Generative Adversarial Network (GAN) having an encoder-decoder architecture. To ensure that latent space characteristics represented by the two latent space codes are not outweighed by encoder-extracted spatial features, the image inpainting system modulates each convolutional layer of the encoder portion and the decoder portion using both latent space codes. Bi-modulating convolutional weights in this manner provides control over synthesized image appearances with respect to factors characterizing an object's visual appearance represented by the known space code. For a given masked image, different combinations of latent space codes are provided as input to the diverse image inpainting model along with the masked image, and each code combination causes the diverse image inpainting model to generate a different synthesized image. Each synthesized image generated from a masked image depicts an object of a predefined type that is visually realistic, semantically coherent with unmasked portions of the masked image, and readily distinguishable from objects depicted in other synthesized images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In some implementations, entities represented in the figures are indicative of one or more entities and thus reference is made interchangeably to single or plural forms of the entities in the discussion.

DETAILED DESCRIPTION

Figure 1:
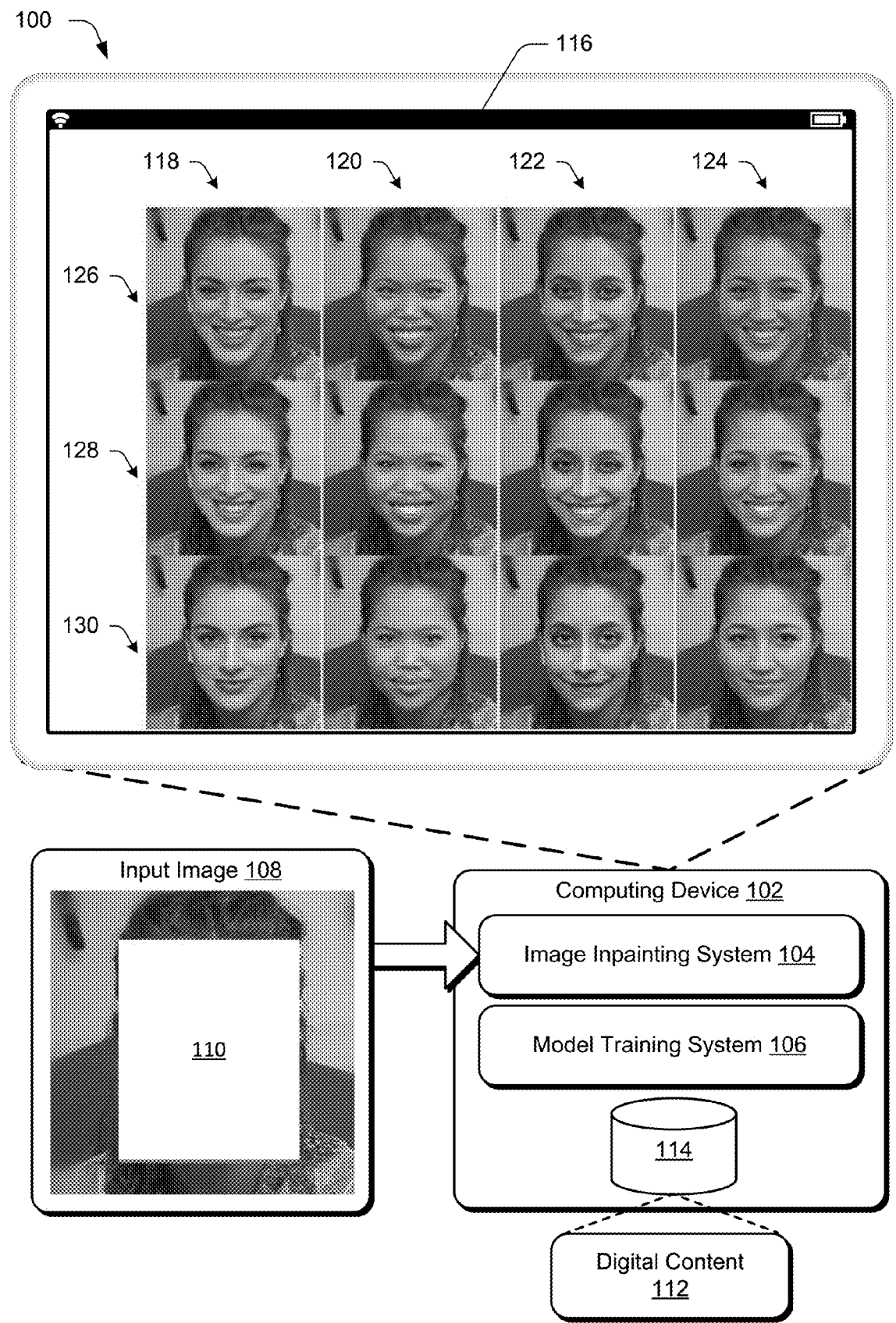
FIG. 1 is an illustration of a digital medium environment in an example implementation that is operable to employ an image inpainting system for generating a diverse range of synthesized images from a masked input image and a model training system configured to generate a diverse image inpainting model employed by the image inpainting system.

Image inpainting involves reconstructing a missing region in an image in a manner that makes the reconstructed region appear both realistic and semantically coherent with portions of the image surrounding the missing region. For a given image, there are many plausible solutions for filling in the missing region while maintaining realism and semantic coherence with a remainder of the image. To generate a range of solutions for filling in a missing region, conventional inpainting methods rely on low-level assumptions gleaned from two-dimensional spatial features of a masked image to fill in a masked region. However, such conventional approaches often result in over-smoothing and generate synthesized images where an inpainted region bears little semantic coherence with unmasked portions surrounding the inpainted region.

To address this visual semantics problem, some conventional inpainting approaches implement deep learning methods such as GAN encoder-decoder architectures. For instance, conventional GAN-based approaches combine encoded features representing two-dimensional spatial features of a masked input image with a random latent space code to fill in a missing region of the masked input image. To produce diverse inpainting results from the same masked input image, different random latent space codes are input to the conventional GAN inpainting model.

However, by virtue of the encoder-decoder architecture, where the encoder extracts extra spatial features from the masked input image, conventional GAN-based inpainting approaches are restricted with respect to output diversity, as the numerous encoder-extracted spatial features outweigh a generative influence of the randomly sampled latent space code. As an alternative to GAN-based approaches, some conventional inpainting approaches implement transformer-based models in an attempt to improve inpainting diversity. However, as a trade-off to improved diversity, transformer-based inpainting approaches suffer from degraded image quality relative to synthesized images generated via GAN-based approaches.

Thus, conventional image inpainting approaches are unable to produce both realistic and diverse synthesized images from a single masked image. As an additional shortcoming, conventional image inpainting approaches do not enable control over specific image features during inpainting. For instance, conventional GAN-based inpainting approaches randomly sample latent space codes and do not offer control over visual characteristics represented in the latent space used to fill in a missing region when generating a synthesized image.

To address these conventional shortcomings, an image inpainting system is described that implements a diverse image inpainting model to generate one or more synthesized images from a masked input image. The image inpainting system advantageously enables control over at least one known factor characterizing a visual appearance of an object depicted in the inpainted region of the synthesized image. To enable this control over an object's visual appearance, training the diverse image inpainting model involves disentangling latent space to learn separate codes for different factors. The diverse image inpainting model is trained to learn a known code that represents the one or more factors characterizing the visual appearance of the object in a latent space and an unknown code that represents factors apart from the one or more factors represented by the known code in the latent space. As an example, in an implementation where the diverse image inpainting model is trained to inpaint a human face at a masked region of an input image, the known code represents a facial expression of the human face and the unknown code represents a visual appearance of the human face apart from the facial expression. Different combinations of a known space code and an unknown space code are then provided as input with a masked input image to output a diverse range of synthesized images that each depict a different version of an object in the masked region of the input image.

To ensure that the different combinations of known space and unknown space codes achieve visually diverse objects, the diverse image inpainting model is trained using two contrastive losses—one for each of the disentangled latent spaces represented by the known space codes and the unknown space codes. The known space contrastive loss causes the diverse image inpainting model to force known space codes that represent visually similar predefined factors closer together in latent space and distance known space codes that represent visually dissimilar predefined factors further apart in the latent space. Likewise, the unknown space contrastive loss causes the diverse image inpainting model to force unknown space codes that represent visually similar characteristics other than the predefined factors closer together in latent space and distance unknown space codes that represent visually dissimilar characteristics other than the predefined factors further apart in the latent space.

To ensure that latent space characteristics represented by the known space and unknown space codes are not outweighed by encoder-extracted spatial features, the image inpainting system modulates weights of each convolutional layer of the GAN encoder portion and the decoder portion using both the known space and unknown space codes. From training with contrastive loss, the diverse image inpainting model ensures that different combinations of known space and unknown space codes generate visually diverse synthesized images from a common masked input image. Further, by bi-modulating convolutional weights of the diverse image inpainting model, the image inpainting system enables control over synthesized image appearances with respect to factors characterizing an object's visual appearance represented by the known space code, which is not possible using conventional image inpainting systems.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by a business to perform operations "over the cloud."

The computing device 102 is illustrated as including an image inpainting system 104 and a model training system 106. The image inpainting system 104 is representative of functionality that generates diverse inpainting results for a masked region of an image, such as the masked region 110 of input image 108 illustrated in FIG. 1. To do so, the image inpainting system 104 leverages a trained machine learning model generated by the model training system 106. The model training system 106 is configured to train a GAN having an encoder-decoder framework using a training dataset that includes a plurality of masked images, where each image in the training dataset depicts an object (e.g., human face, car, bird, etc.) common among images in the training dataset and is masked to visually obscure the object. In implementations, a GAN refers to a class of artificial intelligence system that uses two types of artificial neural networks (e.g., the encoder portion and the decoder portion of the encoder-decoder framework) contesting with each other in a zero-sum game framework.

The input image 108, a masked version of the input image 108 that includes a masked region 110 to be filled via inpainting, and one or more synthesized images generated from the masked input image 108 by the image inpainting system 104 are each representative of digital content 112 maintained in storage 114 of the computing device 102. Alternatively or additionally, the input image 108, the masked instance of input image 108, and one or more synthesized images generated by the image inpainting system 104 are each representative of digital content 112 maintained in storage of a different computing device connected to the computing device 102.

During training, each image in the training dataset is tagged with two codes representing visual characteristics of the masked object, with one code representing a "known factor" and the other code representing an "unknown factor." The known factor is representative of information that characterizes a visual appearance of the object as it appears in an unmasked version of the image. For instance, the known factor specifies one or more visual characteristics of the masked object in the training image, with the one or more visual characteristics defined based on a classifier selected during generation of the training dataset.

For instance, in an example implementation where the training dataset includes a plurality of images that each depict a human face and a facial recognition classifier is used to assign known factor codes, the known factor code assigned to a training image is representative of an identity of the human face. In this example, for a training image depicting Morgan Freeman, the known factor code indicates that the training image includes the facial identity of Morgan Freeman.

In another example implementation where a human pose classifier is used to assign known factor codes to the training dataset including images that each depict a human face, the known factor code assigned to a training image is representative of a pose (e.g., orientation, position, etc.) of the human face. As yet another example, in an implementation where a facial expression classifier is used to assign known factor codes to the training dataset including images that each depict a human face, the known factor code assigned to a training image is representative of a facial expression (e.g., smiling, frowning, etc.) of the human face.

Thus, reference to a "known factor" refers to a certain visual characteristic of an object depicted by an image, where the certain visual characteristic is predefined based on a particular image classifier implemented by the model training system 106 when generating the training dataset. As further examples, known factors for a training dataset of images that each depict a car include a style of the car (e.g., sedan, SUV, truck, etc.), a color of the car (e.g., red, white, blue, etc.), and so forth. As further examples, known factors for a training dataset of images that each depict a bird include a species of the bird (e.g., sparrow, goldfinch, bluebird, etc.), a color palette (i.e., a collection of color space values included in a structural coloration for a bird), and so forth. Thus, references throughout this description to specific examples of known factor codes are utilized for explanatory purposes and are made without limitation as to the scope of image characteristics represented by a known factor code.

The unknown code assigned to each training image is representative of visual characteristics of the image apart from the predefined characteristic(s) of the image captured by the known factor code. For instance, in an example implementation where a training image depicts a human face and is assigned a known factor code that represents an identity of the face, the model training system is configured to assign an unknown factor code that represents visual characteristics of the face other than identity, such as facial expression, skin pigmentation, pose, lighting conditions, size of nose, distance between eyes, and so forth. In this manner, the model training system 106 is representative of functionality of the computing device 102 to generate a trained machine learning model for use by the image inpainting system 104 in performing image inpainting for a particular object type (e.g., human face, car, bird, and so forth).

Via use of known factor codes, the trained machine learning model generated by the model training system 106 is configured to perform image inpainting with a degree of control relative to the known factor. For instance, consider an example implementation where the image inpainting system 104 implements a machine learning model trained by the model training system 106 to synthesize human faces with human identity as a known factor. In this example implementation, synthesized images generated by the image inpainting system 104 are controllable to depict different unknown factors while maintaining an identity of the human face (e.g., different synthesized images depict different lighting conditions, different facial expressions, different poses, and so forth while depicting the same human face). Alternatively, in this example implementation synthesized images generated by the image inpainting system 104 are controllable to depict different human face identities while maintaining a common unknown factor (e.g., different synthesized images depict different faces that share a common facial expression, pose, lighting condition, and so forth).

In the illustrated example of FIG. 1, an example set of diverse synthesized images generated by the image inpainting system 104 by inpainting the masked region 110 of input image 108 is depicted on the display 116 of computing device 102. Specifically, FIG. 1 illustrates a set of synthesized images generated by the image inpainting system 104 as displayed in a grid arrangement that includes columns 118, 120, 122, and 124 and rows 126, 128, and 130. As evidenced by the illustrated example, FIG. 1 depicts an implementation where the image inpainting system 104 implements a machine learning model trained by the model training system 106 to synthesize human faces with human identity as a known factor.

In this manner, each synthesized image included in a single column depicts a face for a given human identity, such that each synthesized image in the column is generated using a common known factor. For instance, column 118 includes three synthesized images that each represent a common identity, such that a human observer readily identifies the three synthesized images in column 118 as depicting the same person. Likewise, column 120 includes three synthesized images that depict a common human identity that is readily distinguished from the respective human identities depicted in the images of columns 118, 122, and 124.

Each synthesized image included in a single row is representative of a human face generated by inpainting the masked region 110 using a common unknown factor. For instance, while the four images in row 126 each depict a face associated with a different human identity, visual characteristics other than the human identity are commonly observed throughout the row 126. For instance, the different human identities depicted by the synthesized images in row 126 share a common facial expression, lighting conditions, skin tone characteristics, and so forth. In a similar manner, the four different human identities depicted in the respective synthesized images of rows 128 and 130 share common visual characteristics apart from the visual characteristics controlled by the known code (e.g., human identity).

Thus, the image inpainting system 104 is configured to generate a diverse range of synthesized images by inpainting a masked region 110 of an input image 108 using a machine learning model generated by the model training system 106. Further, the image inpainting system 104 is configured to enable control of the generated synthesized images based on a known factor used by the model training system 106 during training of the machine learning model. For instance, although the illustrated example of FIG. 1 depicts an example implementation where 12 synthesized images are generated from the masked input image 108, the image inpainting system 104 is configured to generate any number of synthesized images.

The image inpainting system 104 is configured to generate synthesized images using a combination of m different known codes and n different unknown codes, where m and n each represent an integer greater than or equal to one. In some implementations the image inpainting system 104 is configured to receive input from a user of the computing device 102 specifying numbers of different known codes and unknown codes to use when generating a diverse range of synthesized images by inpainting the masked region 110 of input image 108. As an example, the synthesized images included in columns 118, 120, 122, and 124 and rows 126, 128, and 130 are generated responsive to user input instructing the image inpainting system to generate synthesized images using four different known codes and three different unknown codes, where the known codes represent human identity.

As described in further detail below, the image inpainting system's 104 ability to achieve diverse results in both known and unknown latent spaces is predicated upon implementing a trained machine learning model that leverages bi-modulation of the known factor and unknown factor at each convolutional later of the encoder-decoder framework. In this manner, the model training system 106 generates the machine learning model implemented by the image inpainting system 104 to include a bi-modulated convolutional module at each convolutional layer, such that the convolutional weight for each convolutional kernel is influenced by the known and unknown codes. Via this bi-modulation, the techniques described herein are configured to generate diverse results of synthesized images while maintaining explicit control over the generated results relative to the known and unknown factors, which is not possible using conventional image inpainting approaches.

Having considered an example digital medium environment, consider now a discussion of example systems useable to generate a trained diverse image inpainting model and output synthesized images using the trained diverse image inpainting model.

Image Inpainting and Model Training Systems

Figure 2:
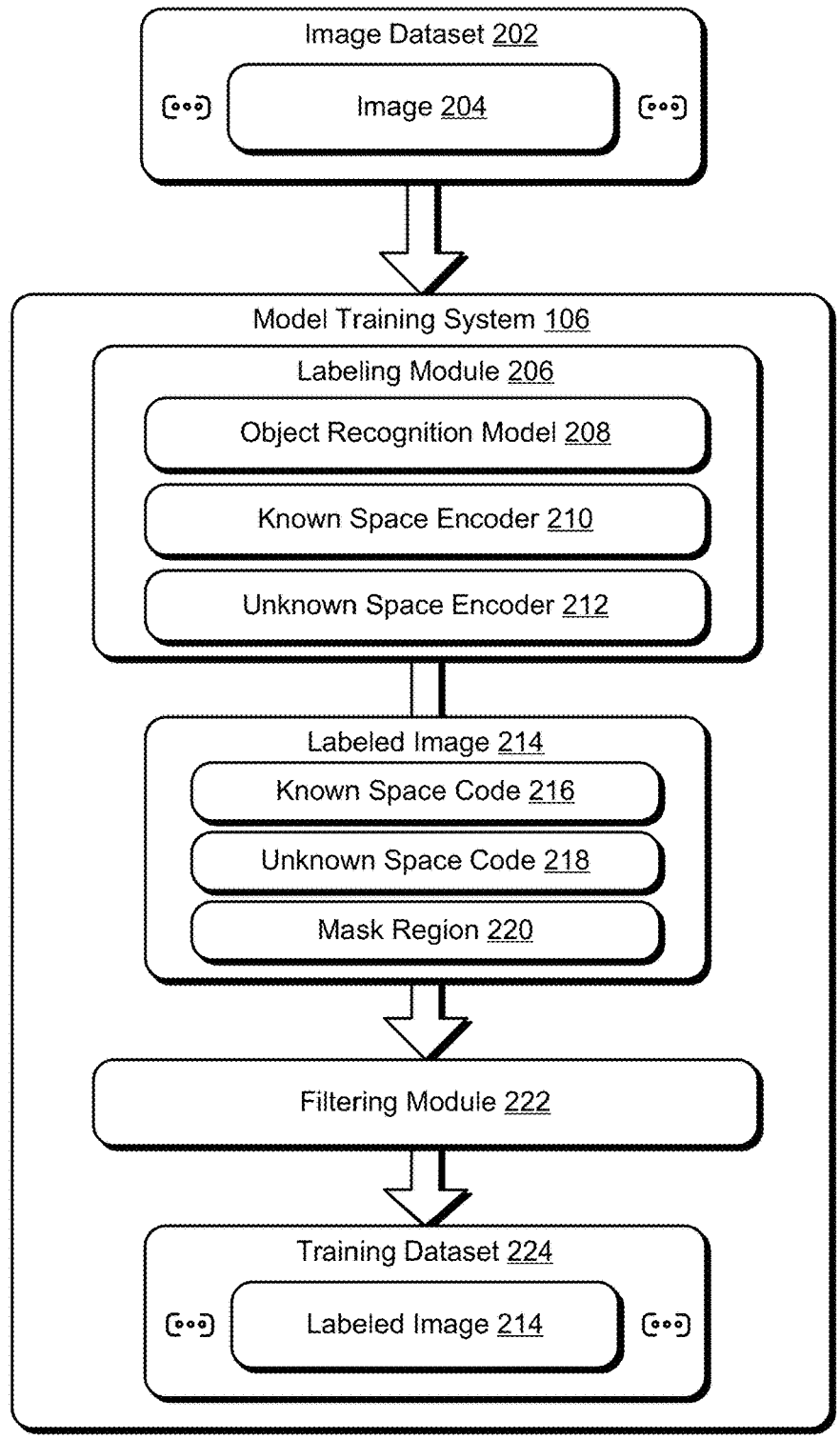
FIG. 2 depicts a digital medium environment showing operation of the model training system of FIG. 1 in producing a training dataset for use in generating the diverse image inpainting model.

FIG. 2 depicts a digital medium environment 200 showing operation of the model training system 106 producing a training dataset for use in generating a diverse image inpainting model.

Figure 3:
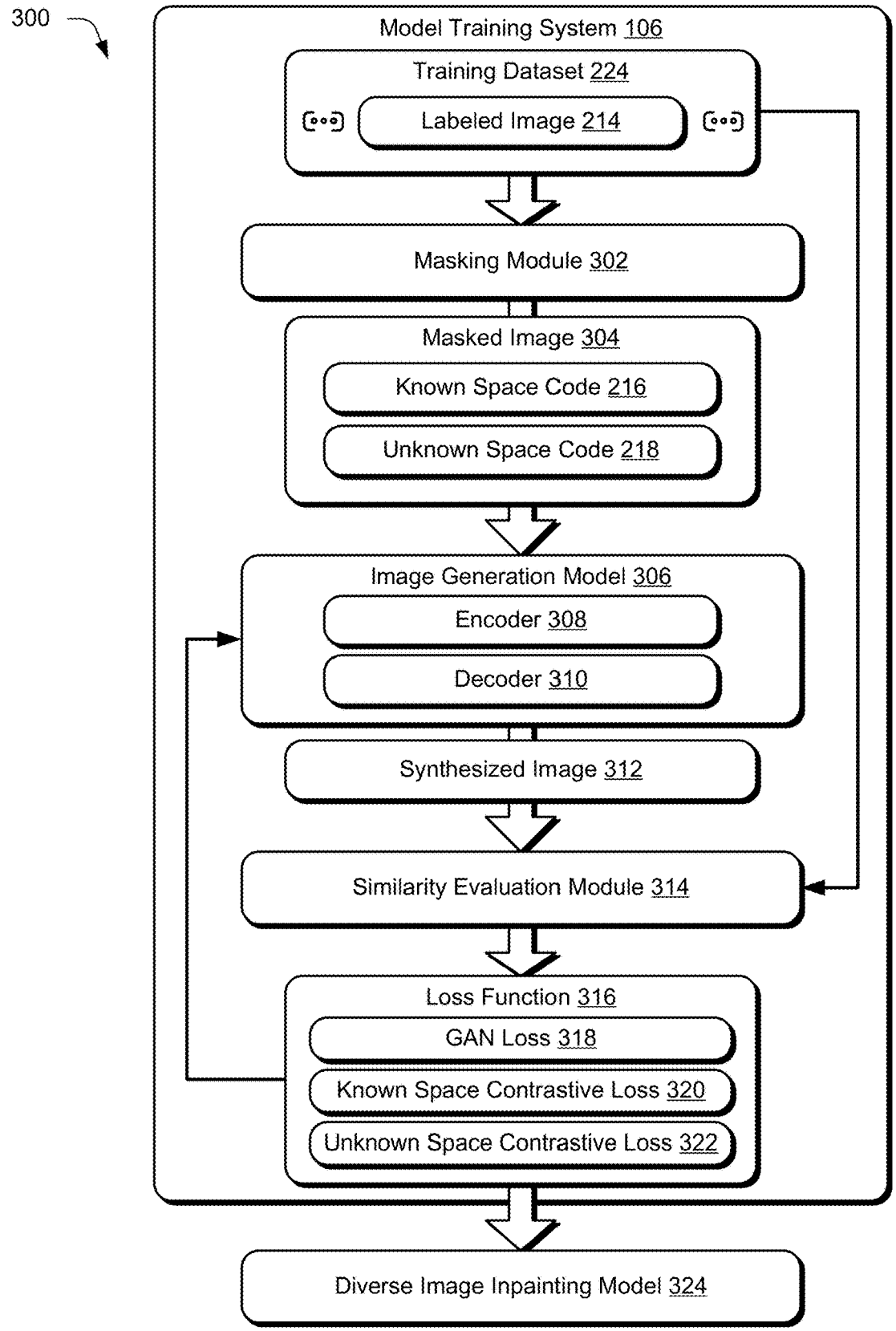
FIG. 3 depicts a digital medium environment showing operation of the model training system of FIG. 1 training the diverse image inpainting model using a training dataset.

FIG. 3 depicts a digital medium environment 300 showing operation of the model training system 106 training the diverse image inpainting model using the training dataset.

Figure 4:
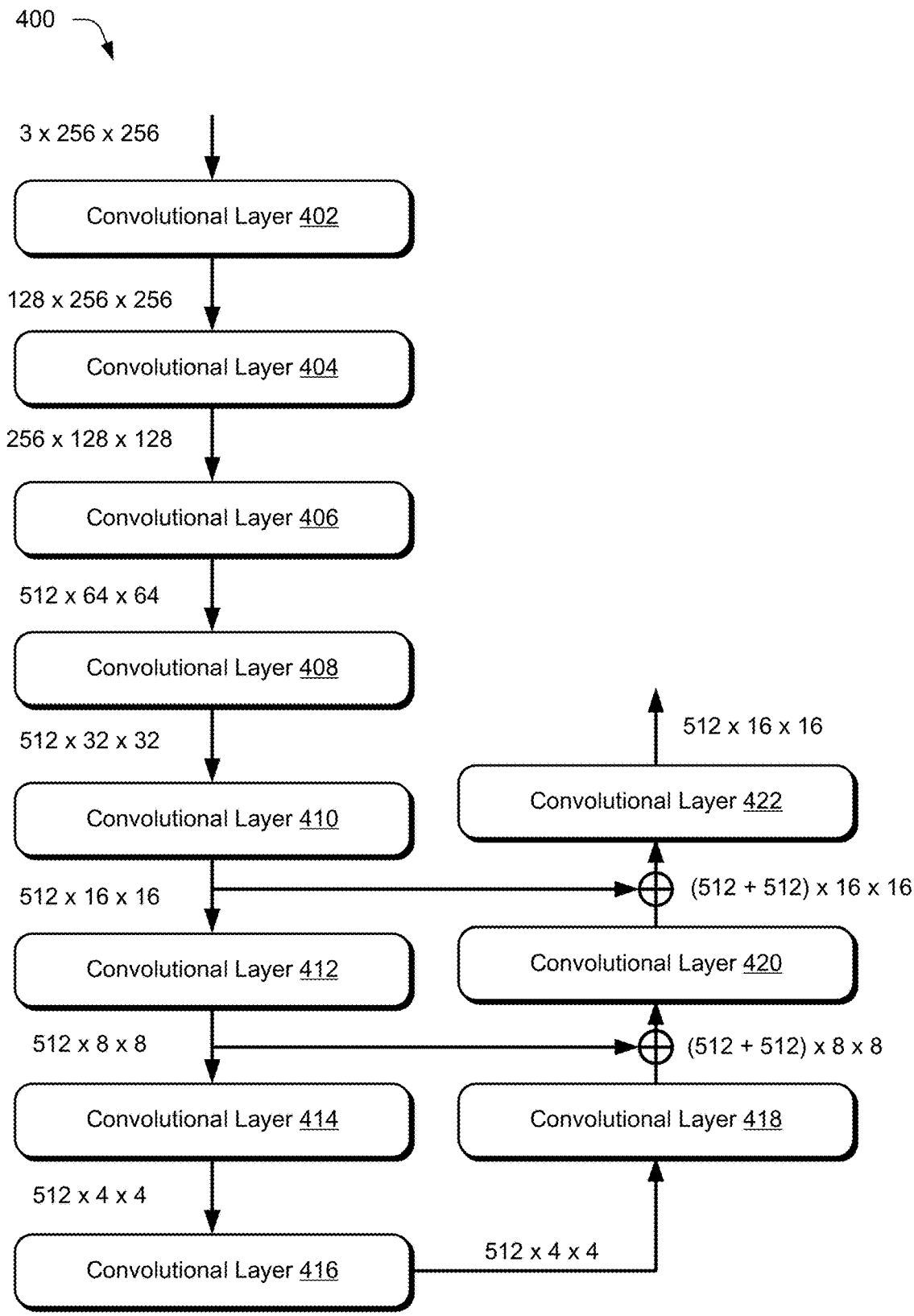
FIG. 4 depicts an example architecture of an encoder portion of the diverse image inpainting model implemented by the image inpainting system of FIG. 1.

FIG. 4 depicts an example architecture 400 of an encoder portion of the diverse image inpainting model implemented by the image inpainting system 104.

Figure 5:
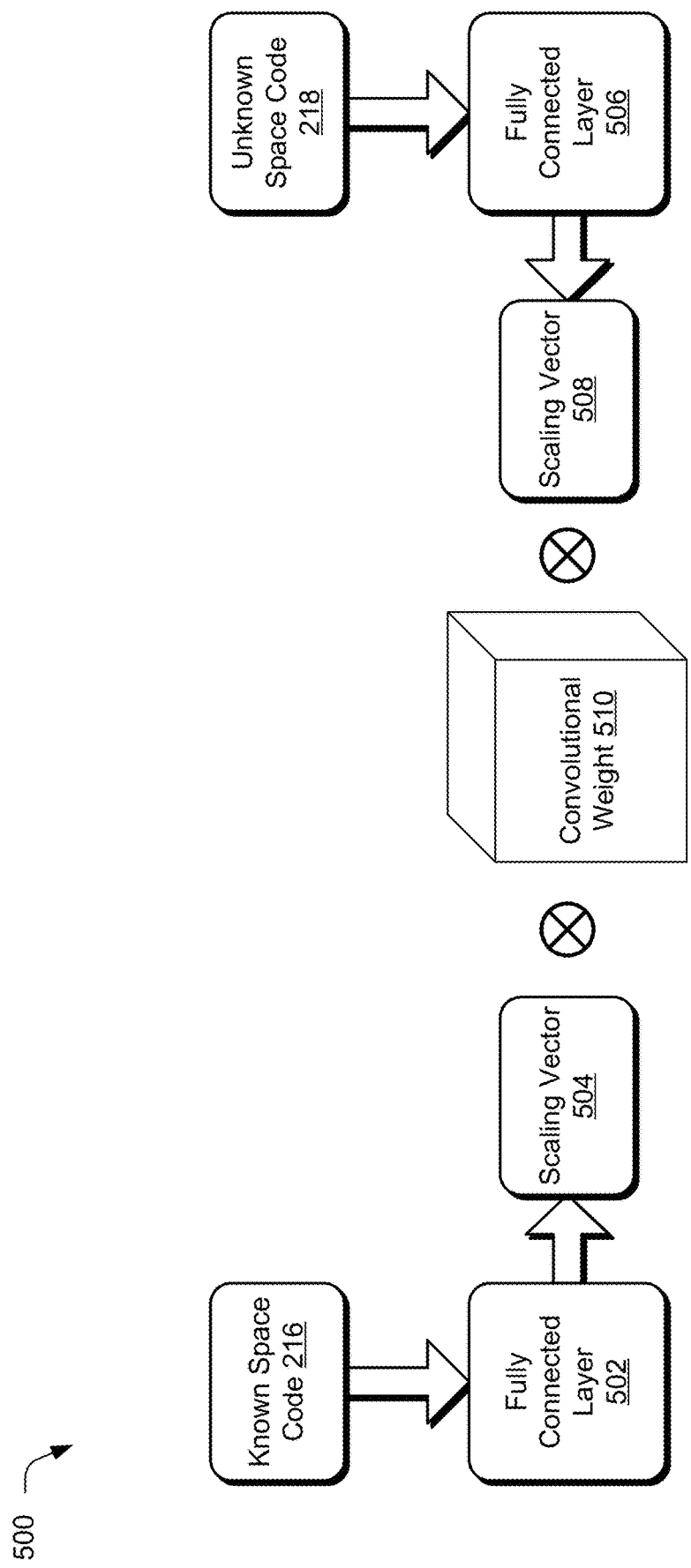
FIG. 5 depicts an example of bi-modulation implemented by different layers of the diverse image inpainting model implemented by the image inpainting system of FIG. 1.

FIG. 5 depicts an example 500 of bi-modulation implemented by different layers of the diverse image inpainting model implemented by the image inpainting system 104.

Figure 6:
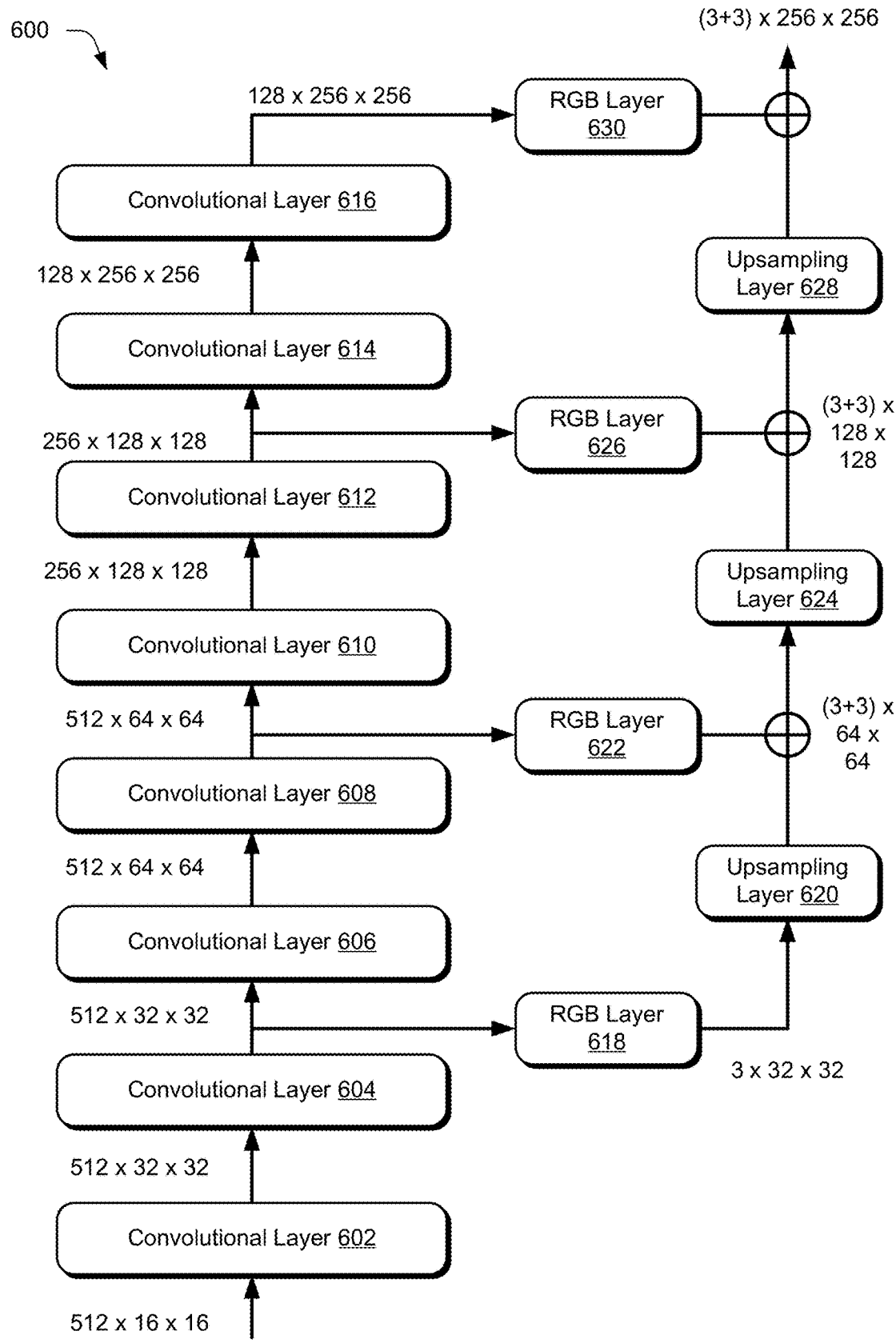
FIG. 6 depicts an example architecture of a decoder portion of the diverse image inpainting model implemented by the image inpainting system of FIG. 1.

FIG. 6 depicts an example architecture 600 of a decoder portion of the diverse image inpainting model implemented by the image inpainting system 104.

Figure 7:
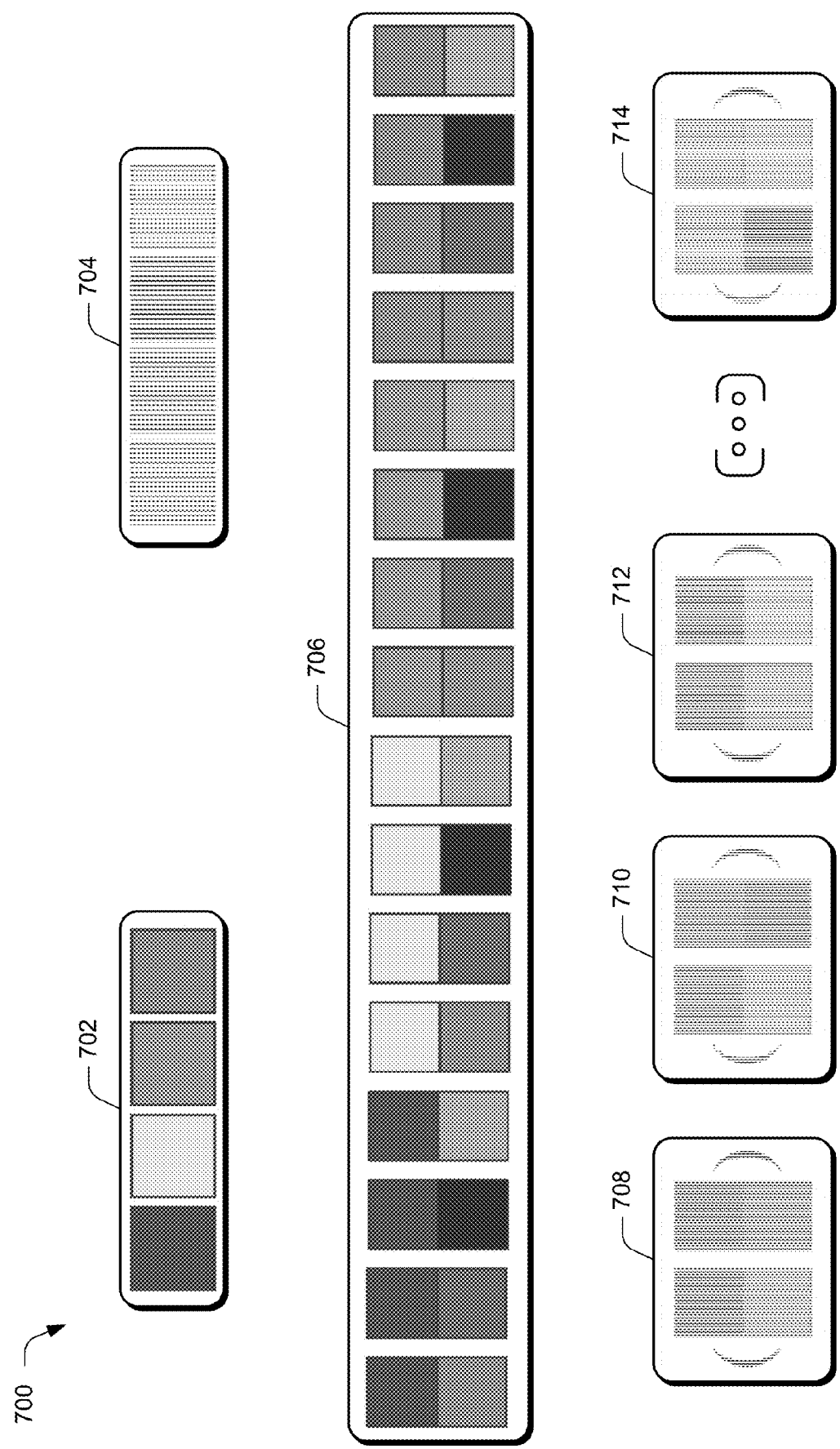
FIG. 7 depicts an example illustrating how known and unknown latent space codes assigned to digital images are used to allocate image pairs for use in training the diverse image inpainting model implemented by the image inpainting system of FIG. 1.

FIG. 7 depicts an example 700 illustrating how known and unknown latent space codes assigned to digital images are used to allocate image pairs for use in training the diverse image inpainting model implemented by the image inpainting system 104.

Figure 8:
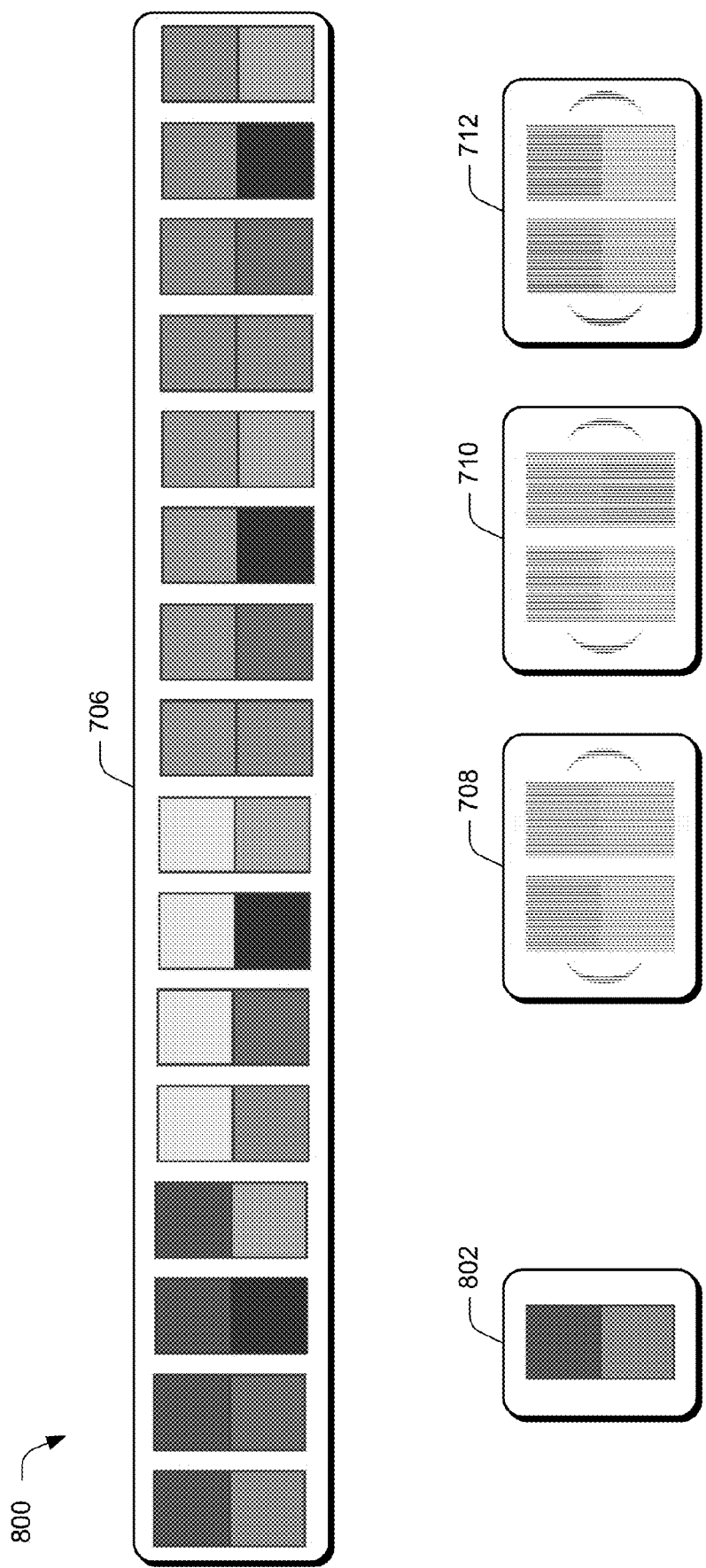
FIG. 8 depicts an example illustrating example positive image pairs for a given image labeled with a known latent space code and an unknown latent space code for use in training the diverse image inpainting model implemented by the image inpainting system of FIG. 1.

FIG. 8 depicts an example 800 illustrating example positive image pairs for an image labeled with a known latent space code and an unknown latent space code for use in training the diverse image inpainting model implemented by the image inpainting system 104.

Figure 9:
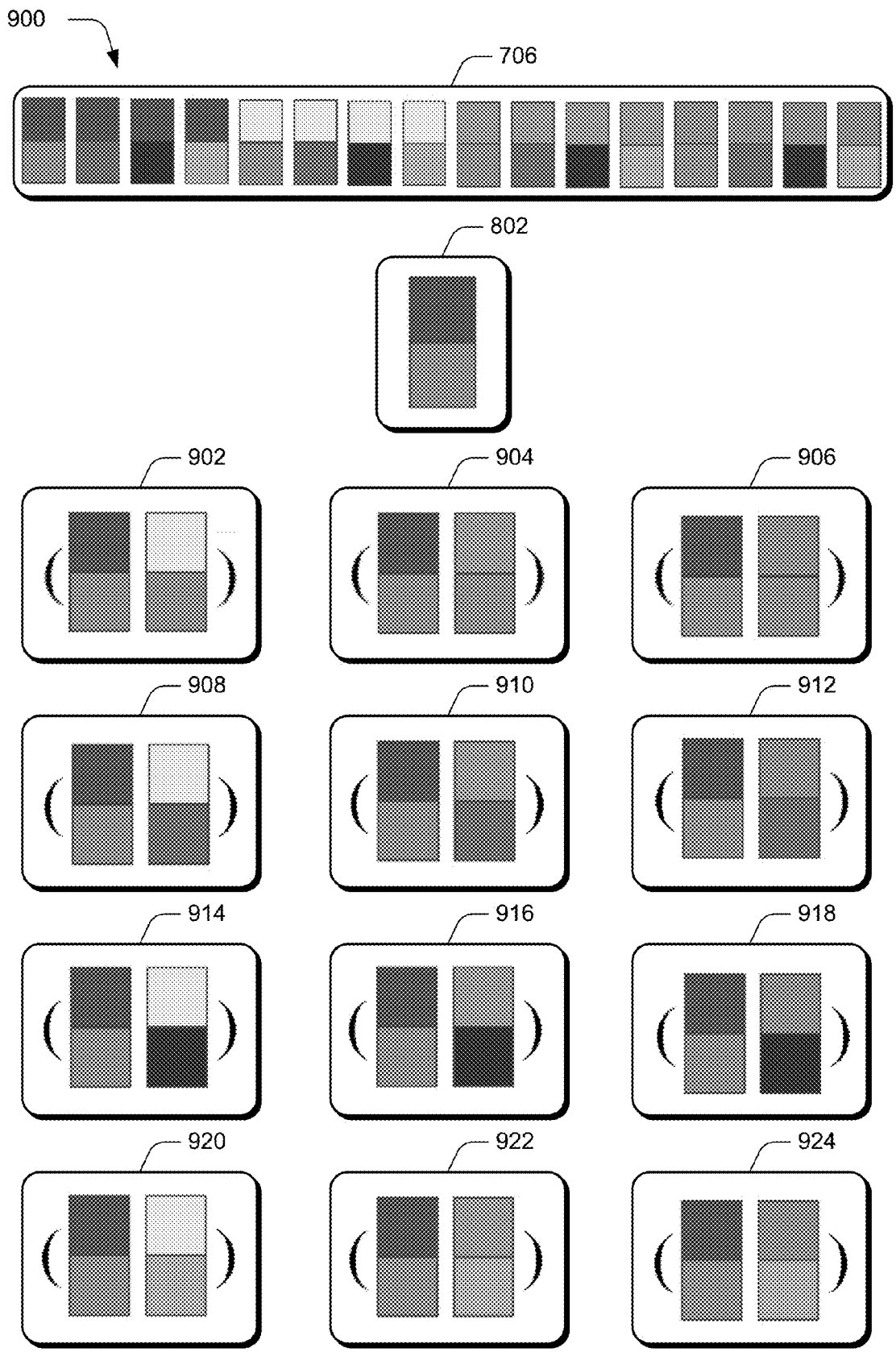
FIG. 9 depicts an example illustrating example negative image pairs for a given image labeled with a known latent space code and an unknown latent space code for use in training the diverse image inpainting model implemented by the image inpainting system of FIG. 1.

FIG. 9 depicts an example 900 illustrating example negative image pairs for an image labeled with a known latent space code and an unknown latent space code for use in training the diverse image inpainting model implemented by the image inpainting system 104.

Figure 10:
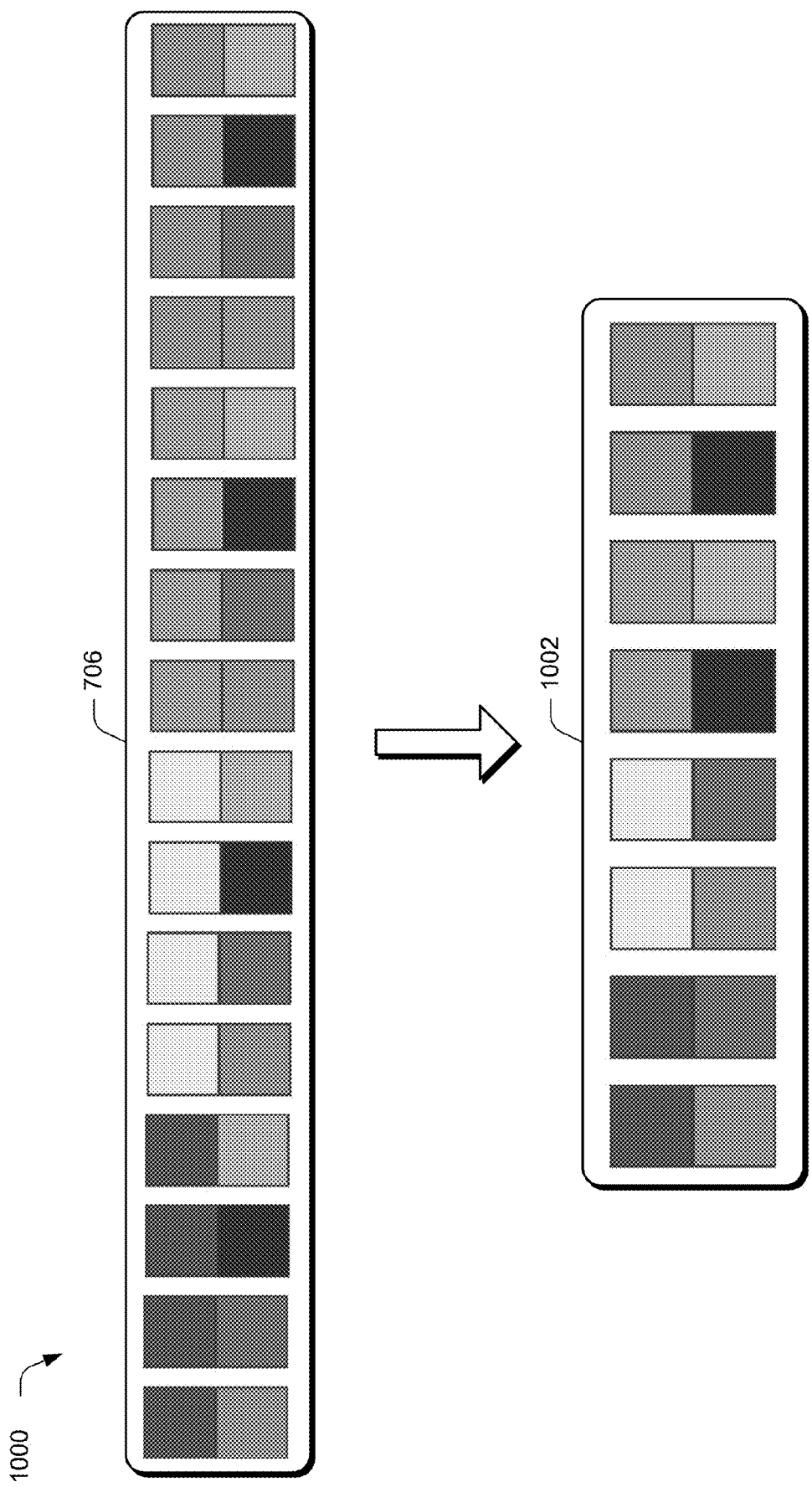
FIG. 10 depicts an example of subsampled known latent space code and unknown latent space code combinations selected for use in training the diverse image inpainting model implemented by the image inpainting system of FIG. 1.

FIG. 10 depicts an example 1000 of subsampled known latent space code and unknown latent space code combinations selected for use in training the diverse image inpainting model implemented by the image inpainting system 104.

As illustrated in FIG. 2, the model training system 106 receives an image dataset 202 that includes a plurality of images 204. Each image 204 represents an image that depicts an object commonly depicted by all images 204 of the image dataset 202. For instance, in an example implementation where the image dataset 202 depicts human faces, each image 204 includes a depiction of a human face. Alternatively, in an example implementation where the image dataset 202 depicts birds, each image 204 includes a depiction of a bird. As yet another example, in an implementation where the image dataset 202 depicts cars, each image 204 depicts a car. Although described herein in the context of specific examples (i.e., depicting human faces, cars, or birds), the described examples are not limiting and the image dataset 202 is representative of any collection of images 204 that each depict an object of a common type.

The model training system 106 includes a labeling module 206, which represents functionality of the model training system 106 to recognize an object depicted in each image 204 of the image dataset 202, assign a known latent space factor to the image 204 based on the recognized object, and assign an unknown latent space factor to the image 204 based on the recognized object. To do so, the labeling module 206 includes an object recognition model 208, a known space encoder 210, and an unknown space encoder 212.

The object recognition model 208 represents a pretrained machine learning model configured to identify a pre-designated object depicted in the image 204 and generate a segmentation map that identifies a region in the image 204 depicting the pre-designated object. For instance, in an example implementation where the image dataset 202 includes a collection of images 204 that each depict a human face, the object recognition model 208 is a pre-trained face parsing model configured to identify semantic regions in each image 204 corresponding to a human face. Examples of human face semantic regions include skin, nose, eyeglasses, left eye, right eye, left eyebrow, right eyebrow, left ear, right ear, mouth, upper lip, lower lip, chin, and so forth. The union of these various semantic regions is defined as the region in the image 204 depicting the face (i.e., the pre-designated object for the face parsing model).

In another example implementation where the image dataset 202 includes a collection of images 204 that each depict a car, the object recognition model 208 is a pre-trained car parsing module configured to identify semantic regions in each image 204 corresponding to a car. Examples of car semantic regions include hood, front bumper, windshield, roof, front right tire, front left tire, back right tire, back left tire, front left door, back left door, front right door, back right door, and so forth. The union of these semantic regions is defined as the region in the image 204 depicting the car (i.e., the pre-designated object for the car parsing model).

The known space encoder 210 represents a pre-trained encoder that is configured to identify a known factor that represents a specific visual characteristic of the recognized object depicted in the image 204. For instance, in an example implementation where the image dataset 202 includes images 204 that each depict a human face and human identity is designated as the known factor, the known space encoder 210 is configured as a facial recognition model such as Arcface described by Deng, et al. in 2019 IEEE/CVF Conference on Computer Vision and Pattern Recognition (CVPR), the disclosure of which is hereby incorporated by reference. In another example implementation where the image dataset 202 includes images 204 that each depict a bird and a bird species is designated as the known factor, the known space encoder 210 is representative of an image classifier trained to identify a species of bird depicted in an image, such as a classifier described by Du, et al. in "Fine-grained visual classification via progressive multi-granularity training of jigsaw patches" in European Conference on Computer Vision, 2020, the disclosure of which is hereby incorporated by reference. In yet another example implementation where the image dataset 202 includes images 204 that each depict a car and a shape (e.g., SUV, sedan, hatchback, coupe, convertible, wagon, van, etc.) of the car is designated as the known factor, the known space encoder 210 is representative of an image classifier trained to identify a shape of a car depicted in an image, such as a different instance of the above-noted classifier described by Du, et al.

The unknown space encoder 212 is configured as an image classifier that is trained to encode visual characteristics of the object identified by the object recognition model 208 other than the visual characteristics contributing to the pre-defined known factor encoded by the known space encoder 210. In accordance with one or more implementations, the unknown space encoder 212 is configured as an instance of the above-noted classifier described by Du, et al. In contrast to the known space encoder 210, the model training system 106 is configured to train the unknown space encoder 212 from scratch to encode visual characteristics of an object apart from those encoded by the known space encoder 210. As a specific example, in an implementation where the image dataset 202 includes images 204 that each depict a human face and the known space encoder 210 is configured to encode each image with a known factor representing an identity of the human face, the unknown space encoder 212 is trained to encode visual characteristics of human face apart from identity. For instance, visual characteristics of the face other than identity include facial expression, skin pigmentation, pose, lighting conditions, size of nose, distance between eyes, and so forth.

The labeling module 206 then outputs a labeled image 214 for each image 204 included in the image dataset 202. Each labeled image 214 represents an instance of a corresponding image 204 with embedded data describing a known space code 216 identified by the known space encoder 210 and an unknown space code 218 identified by the unknown space encoder 212. In this manner, in the example implementation where the image dataset 202 includes images 204 that each depict a human face and identity is specified as the known factor, different images 204 that depict a face corresponding to a same identity (e.g., different images depicting Oprah Winfrey's face) are assigned a same known space code 216. Conversely, when different images 204 depict faces corresponding to different identities, the different images are assigned different known space codes 216.

In a similar manner, continuing the example implementation where the image dataset 202 includes images 204 that each depict a human face and identity is specified as the known factor, different images that depict faces having similar poses, facial expressions, lighting conditions, and other visual characteristics apart from the known factor of identity are assigned a common unknown space code 218. Thus, a comparison of the known space codes 216 assigned to each image in a pair of labeled images 214 reveals whether the images depict a common visual characteristic specified as the known factor. A comparison of the unknown space codes 218 assigned to each image in a pair of labeled images 214 reveals whether the images depict common visual characteristics apart from the visual characteristic(s) specified as the known factor.

The mask region 220 represents a box region in the labeled image 214 that covers the union of the semantic regions defining the object in the image 204 as identified by the object recognition model 208. For instance, in the illustrated example of FIG. 1, where input image 108 depicts a human face, the mask region 220 in the corresponding labeled image 214 generated for input image 108 is depicted as the masked region 110. By defining the mask region 220 as a box that encapsulates the union of semantic regions identified by the object recognition model 208, the labeling module 206 causes the machine learning model trained by the model training system 106 to generate more diverse inpainting results relative to the same model trained using a dataset where the mask region 220 covers only the union of semantic regions identified by the object recognition model 208. For instance, by defining the mask region 220 as a strict object mask, inpainting results are constrained with respect to object shape and pose, while a bounding box that encapsulates at least a portion of the image 204 beyond the strict object mask enables the machine learning model to perform inpainting that alters object shape, pose, and so forth.

After generating a labeled image 214 for each image 204 included in the image dataset 202, the labeling module 206 provides the labeled images 214 to a filtering module 222. The filtering module 222 is representative of functionality of the model training system 106 to select a subset of the labeled images 214 for use as part of a training dataset 224. In some implementations, the subset of the labeled images 214 included in the training dataset 224 is selected based on image resolution. For instance, if a labeled image 214 satisfies a resolution threshold (e.g., images having at least 400×400-pixel resolution with one side having at least 512 pixels), the labeled image 214 is selected for inclusion as part of the training dataset 224 and otherwise excluded from the training dataset 224. Alternatively or additionally, the filtering module 222 assigns labeled images 214 to the training dataset 224 based on a confidence that the object detected by the object recognition model 208 represents the defined object for the image dataset 202. For instance, the filtering module 222 implements a pretrained convolutional neural network (CNN) such as Mask R-CNN as described by He, et al. in IEEE Transactions on Pattern Analysis and Machine Intelligence, 2020, the disclosure of which is hereby incorporated by reference, to identify that a most confident detected object represents the defined object for the image dataset 202.

As an example, in an implementation where the image dataset 202 depicts birds, a labeled image 214 is included in the training dataset 224 responsive to determining that the object recognized by the object recognition model 208 has a highest confidence value of being a bird. Alternatively or additionally, the filtering module 222 assigns labeled images 214 to the training dataset 224 based on a size of the mask region 220 relative to a size of the labeled image 214. For instance, in response to determining that the mask region 220 satisfies a size threshold (e.g., a percentage size relative to a size of the labeled image 214), the filtering module 222 includes the labeled image 214 in the training dataset 224 and otherwise excludes the labeled image 214 from the training dataset 224.

As depicted in FIG. 3, the training dataset 224 is then provided to a masking module 302 of the model training system 106. The masking module 302 represents functionality of the model training system 106 to generate a masked image 304 for each labeled image 214 included in the training dataset 224. Each masked image 304 removes (e.g., deletes, cuts, etc.) a region of the labeled image 214 identified by the mask region 220, causing the masked image 304 to have a visual appearance similar to the input image 108 with its masked region 110 as depicted in FIG. 1. Each masked image 304 retains the known space code 216 and unknown space code 218 as assigned to its corresponding labeled image 214 in the training dataset 224.

The masked images 304 generated from the labeled images 214 in the training dataset 224 are then provided as input to an image generation model 306. The image generation model 306 is representative of an untrained instance of the machine learning model implemented by the image inpainting system 104, as described in further detail below. Generally, the image generation model 306 represents a GAN having an encoder-decoder framework, as represented by the inclusion of encoder 308 and decoder 310. For a detailed illustration of the respective architectures of the encoder 308 and decoder 310, consider FIGS. 4-6.

FIG. 4 depicts an example architecture 400 of the encoder 308 and demonstrates how the encoder 308 processes each masked image 304. Specifically, encoder 308 includes a plurality of convolutional layers, represented as convolutional layers 402, 404, 406, 408, 410, 412, 414, 416, 418, 420, and 422. The masked image 304 is provided as input to the convolutional layer 402 as an image of size 256×256 pixels represented by three channels (e.g., the red, green, and blue (RGB) channels of the masked image 304). In implementations, the convolutional layer 402 is configured as a 3×3 bi-modulated convolutional layer that implements a Leaky Rectified Linear Unit (Leaky ReLu) activation function. As described herein, a bi-modulated convolutional layer is a convolutional layer that injects information describing the known space code 216 and the unknown space code 218 for the masked image 304 to modulate a convolutional kernel. For a detailed description of the bi-modulation process performed by each bi-modulated convolutional layer described herein, consider FIG. 5.

In the illustrated example of FIG. 5, a bi-modulated convolutional layer implemented by the image generation model 306 injects information describing the known space code 216 to a fully connected layer 502 and causes the fully connected layer 502 to generate a scaling vector 504 for the known space code 216. The length of the scaling vector 504 is equivalent to a number of input channels of a convolutional kernel implemented by the bi-modulated convolutional layer. For instance, as depicted in the illustrated example of FIG. 4, convolutional layer 402 includes three input channels, thus the scaling vector 504 generated by convolutional layer 402 has a length of three.

Similarly, the bi-modulated convolutional layer implemented by the image generation model 306 injects information describing the unknown space code 218 into a fully connected layer 506 that is separate from the fully connected layer 502 and causes the fully connected layer 506 to generate a scaling vector 508 from the unknown space code 218. Similar to the scaling vector 504, a length of the scaling vector 508 is defined based on a number of input channels for the convolutional kernel of the bi-modulated convolutional layer. The scaling vector 504 representing the known space code 216 and the scaling vector 508 representing the unknown space code 218 are then used to bi-modulate the convolutional weight 510 for the convolutional kernel. Bi-modulation of the convolutional weight 510 is performed as expressed in Equation 1:

$$w'_{ijk} = s_i \cdot t_i \cdot w_{ijk} \quad \text{(Eq. 1)}$$

In Equation 1, k represents the known space code 216, u represents the unknown space code 218, w represents the original convolutional weight 510 for the convolutional kernel and w' represents the bi-modulated convolutional weight 510 for the convolutional kernel. Scaling vector 504 is represented in Equation 1 as s and scaling vector 508 is represented as t, with $s_i$ and $t_i$ representing scaling factors corresponding to the ith input feature map. Finally, j and k enumerate the output feature maps and the spatial footprint of the convolution for the bi-modulated convolutional layer (e.g., each of the convolutional layers implemented by the encoder 308 and the decoder 310 of the image generation model 306).

Returning to FIG. 4, the convolutional layer 402 outputs as a result of its bi-modulation a representation of the masked image 304 having a size of 256×256 pixels and an increased channel dimension of 128. The output of convolutional layer 402 is then provided to convolutional layer 404, which is a 3×3 bi-modulated convolutional layer that implements a Leaky ReLu activation function and performs bi-modulation as described with reference to FIG. 5. Additionally, convolutional layer 404 performs downsampling to output a representation of the masked image 304 having a size of 128×128 pixels and an increased channel dimension of 256. This process of downsampling and increasing channel dimension is continued by convolutional layers 408, 410, 412, and 414, which each represent a 3×3 bi-modulated convolutional layer that implements a Leaky ReLu activation function and performs bi-modulation as described with reference to FIG. 5, until outputting a representation of the masked image 304 having a size of 4×4 pixels and a channel dimension of 512. Output of the convolutional layer 414 is provided to convolutional layer 416, which represents a 3×3 bi-modulated convolutional layer that implements a Leaky ReLu activation function and performs bi-modulation as described with reference to FIG. 5 to output a representation of the masked image 304 having a size of 4×4 pixels and a channel dimension of 512 to convolutional layer 418.

Convolutional layer 418 represents a 3×3 bi-modulated convolutional layer that implements a Leaky ReLu activation function, performs bi-modulation as described with reference to FIG. 5, and upsamples the output of convolutional layer 416 to output a representation of the masked image 304 having a size of 8×8 pixels and a channel dimension of 512. The output of convolutional layer 418 is combined with the output of convolutional layer 412 and provided as input to convolutional layer 420.

Convolutional layer 420 represents a 3×3 bi-modulated convolutional layer that implements a Leaky ReLu activation function, performs bi-modulation as described with reference to FIG. 5, and upsamples its input to output a representation of the masked image 304 having a size of 16×16 pixels and a channel dimension of 512. The output of convolutional layer 420 is combined with the output of convolutional layer 410 and provided as input to convolutional layer 422.

Convolutional layer 422 represents a 3×3 bi-modulated convolutional layer that implements a Leaky ReLu activation function and performs bi-modulation as described with reference to FIG. 5 to output a representation of the masked image 304 having a size of 16×16 pixels and a channel dimension of 512. The output of convolutional layer 422 is then provided as input to the decoder 310 of the image generation model 306.

FIG. 6 depicts an example architecture 600 of the decoder 310 in accordance with one or more implementations. The decoder 310 includes a plurality of convolutional layers 602, 604, 606, 608, 610, 612, 614, and 616. Each of the convolutional layers 602, 604, 606, 608, 610, 612, 614, and 616 represents a 3×3 bi-modulated convolutional layer that implements a Leaky ReLu activation function and performs bi-modulation as described with reference to FIG. 5. The decoder 310 is configured to perform two iterations of bi-modulated convolution for each resolution representation of the masked image 304. Additionally, the decoder 310 processes each resolution representation of the masked image 304 using a layer that converts the tensor output from a convolutional layer to a three-channel RGB output.

Specifically, as depicted in FIG. 6, the output of convolutional layer 422 is provided to convolutional layer 602, which performs upsampling to output a representation of the masked image 304 having a size of 32×32 pixels and a channel dimension of 512. Convolutional layer 604 in turn processes the input from convolutional layer 602 to output a representation of the masked image 304 having a size of 32×32 pixels and a channel dimension of 512 as input to convolutional layer 606. The output of convolutional layer 604 is then processed by RGB layer 618, which converts the 512×32×32 tensor to a three-channel RGB representation. The output of RGB layer 618 is then processed by upsampling layer 620 to achieve a 64×64 pixel resolution.

Convolutional layer 606 processes the 512×32×32 tensor and upsamples it to output a 64×64 pixel resolution representation of the masked image 304 having 512 channels, which is processed as input by the convolutional layer 608 to output a tensor representing the masked image 304 as a 64×64 pixel image having 512 channels, which in turn is provided as input to convolutional layer 610. The output of convolutional layer 608 is further provided to RGB layer 622, which converts the 512×64×64 tensor to a three-channel RGB representation of the masked image 304. The output of the RGB layer 622 is then processed in combination with the output of the upsampling layer 620 by upsampling layer 624 to achieve a 128×128 pixel resolution.

Convolutional layer 610 processes the 512×64×64 tensor and upsamples it to output a 128×128 pixel resolution representation of the masked image 304 having 256 channels, which is processed as input by the convolutional layer 612 to output a tensor representing the masked image 304 as a 128×128 pixel image having 256 channels, which in turn is provided as input to convolutional layer 614. The output of convolutional layer 612 is further provided to RGB layer 626, which converts the 256×128×128 tensor to a three-channel RGB representation of the masked image 304. The output of the RGB layer 626 is then processed in combination with the output of the upsampling layer 624 by upsampling layer 628 to achieve a 256×256 pixel resolution.

Convolutional layer 614 processes the 256×128×128 tensor and upsamples it to output a 256×256 pixel resolution representation of the masked image 304 having 128 channels, which is processed as input by the convolutional layer 616 to output a tensor representing the masked image 304 as a 256×256 pixel image having 128 channels. The output of convolutional layer 616 is provided to RGB layer 630, which converts the 128×256×256 tensor to a three-channel RGB representation of the masked image 304. The output of the RGB layer 630 is then processed in combination with the output of the upsampling layer 628 and output as the synthesized image 312 as depicted in FIG. 3.

The synthesized image 312 represents an instance of a synthesized image generated from the masked version of input image 108, where the image generation model 306 performs inpainting on the masked region 110. In this manner, the synthesized image 312 represents one of the synthesized images depicted in the grid of synthesized images spanning columns 118, 120, 122, and 124 and rows 126, 128, and 130 illustrated in FIG. 1. Via bi-modulating the known space code 216 and the unknown space code 218 to each convolutional layer of the encoder 308 and the decoder 310, the visual appearance of the synthesized image 312 as generated from the masked image 304 is dependent on a particular combination of known space code 216 and unknown space code 218 assigned to the masked image 304. The model training system 106 continues to train the image generation model 306 by providing additional masked images 304 generated from the training dataset 224 as input to the image generation model 306 and causing the image generation model 306 to generate a synthesized image 312 for each masked image 304.

For each training iteration, after the image generation model 306 generates a synthesized image 312 for each possible combination of known space code 216 and unknown space code 218 included in the training dataset 224, the model training system 106 implements a similarity evaluation module 314 to evaluate image similarity between individual pairs of synthesized images 312 by comparing images in each respective pair of synthesized images 312. The similarity evaluations performed by the similarity evaluation module 314 are used to generate a loss function 316 for training the image generation model 306. The loss function 316 is representative of a combination of GAN loss 318, contrastive loss in the known factor latent space, represented as known space contrastive loss 320, and contrastive loss in the unknown factor latent space, represented as unknown space contrastive loss 322.

GAN loss 318 is representative of a standard GAN loss function, such as the GAN loss used in StyleGAN2, as described by Karras, et al. in Analyzing and improving the image quality of StyleGAN, CVPR, 2020, the disclosure of which is hereby incorporated by reference. Generally, the known space contrastive loss 320 is designed to force the image generation model 306 to cluster visually similar known space codes 216 closer in latent space and distance visually dissimilar unknown space codes 218 in the latent space. Similarly, the unknown space contrastive loss 322 is designed to force the image generation model 306 to cluster visually similar unknown space codes 218 closer in the latent space and distance visually dissimilar unknown space codes 218 in the latent space. Collectively, the use of both known space contrastive loss 320 and the unknown space contrastive loss 322 causes the image generation model 306 to disentangle the latent space into a known factor space that corresponds to the image characteristics encoded by the known space encoder 210 and an unknown factor representing image characteristics encoded by the unknown space encoder 212.

For a detailed description of computing known space contrastive loss 320 and unknown space contrastive loss 322, consider the following description with respect to FIGS. 7-10. Functionality of the image generation model 306 is represented by Equation 2, where I represents the masked image 304, k represents the known space code 216, u represents the unknown space code 218, G represents the image generation model 306, and S represents the synthesized image 312.

$$S_{k,u,I}=G(k,u,I) \quad \text{(Eq. 2)}$$

An image pair of two synthesized images 312 evaluated by the similarity evaluation module 314 is defined as P(k, u), (k', u') as set forth in Equation 3:

$$P(k,u),(k',u')=(S_{k,u},S_{k',u'}) \quad \text{(Eq. 3)}$$

As a precondition, the similarity evaluation module 314 is prohibited from considering a pair of synthesized images 312 sharing common known and unknown codes as a valid pair. That is, k=k' and u=u' cannot coexist for a valid pair of synthesized images 312.

The illustrated example 700 of FIG. 7 visualizes the concept of image pairs by representing individual known space codes 216 and individual unknown space codes 218 as individual colors. Specifically, the illustrated example 700 depicts an example scenario of synthesized images 312 and pairs of synthesized images 312 generated from four different known space codes 702 and four different unknown space codes 704. The red, yellow, pink, and orange boxes of the known space codes 702 each represent a different known space code 216. The blue, green, purple, and cyan boxes of the unknown space codes 704 each represent a different unknown space code 218.

Image set 706 represents the possible set of masked images 304 processed by the image generation model 306 without repeating combinations of the known space codes 702 and unknown space codes 704. Consequently, image set 706 also represents the possible set of synthesized images 312 generated from the masked images 304 without repeating combinations of the known space codes 702 and unknown space codes 704. In implementations, the model training system 106 is configured to train the image generation model 306 without repeating previously used combinations of the known space codes 702 and unknown space codes 704 to reduce bias towards a particular visual characteristic represented by a known space code 216 or unknown space code 218 and consequently improve diversity in the synthesized images 312 generated by the image generation model 306.

Valid image pairs for the image set 706 as constrained by Equation 3 are illustrated as image pairs 708, 710, 712, and 714. Given the 16 different images included in the image set 706, the total number of valid image pairs is represented as $$\binom{16}{2},$$

resulting in 120 valid image pairs for the image set 706 generated from four different known space codes 702 and four different unknown space codes 704.

Computation of the known space contrastive loss 320 and the unknown space contrastive loss 322 requires the similarity evaluation module 314 to consider positive image pairs in the known factor latent space, negative image pairs in the known factor latent space, positive image pairs in the unknown factor latent space, and negative image pairs in the unknown factor latent space.

A positive image pair in the known factor latent space refers to a pair of synthesized images 312 sharing the same known space code 216 and having different unknown space code 218. The illustrated example 800 of FIG. 8 depicts an example of positive image pairs in the known factor latent space for image 802 selected from image set 706. Specifically, positive image pairs in the known latent space for image 802 include image pair 708, image pair 710, and image pair 712, which represent the set of image pairs sharing a common known space code 216 represented by the red block and constrained by Equation 3. Extrapolating to all images in the image set 706 having a known space code 216 represented by a red block, the set of positive pairs for the red known space code is represented as $$\binom{4}{2}.$$

Because the image set 706 includes four different known space codes 216, the set of positive image pairs in the known latent space is represented as $$4 \times \binom{4}{2},$$

which reveals there are 24 positive image pairs in the known factor latent space for the image set 706.

A negative image pair in the known latent space refers to a pair of synthesized images 312 that do not share the same known space code 216. With respect to the known latent space, a hard negative pair of synthesized images 312 refers to two images that share the same unknown space code 218 and have different known space codes 216. Hard negative pairs are significant with respect to the known latent space because they are useable to force the image generation model 306 to recognize similarities in the unknown factor latent space among synthesized images 312 that differ in the known factor latent space. For instance, consider an example implementation where an image pair depicts two human faces with human identity being the known factor. In this example implementation, a hard negative pair in the known latent space is useable to identify similarities between a pair of synthesized images 312 that depict different identities other than characteristics contributing to the known factor (e.g., that both faces are smiling).

The illustrated example 900 of FIG. 9 depicts a set of negative pairs for the image 802 from the image set 706. Specifically, each of image pairs 902, 904, 906, 908, 910, 912, 914, 916, 918, 920, 922, and 924 represent a possible negative image pair for the image 802 within the image set 706. Among the 12 negative image pairs illustrated in FIG. 9, image pairs 902, 904, and 906 each represent a hard negative image pair where each image in the pair of image shares a common unknown code (e.g., each image has the same blue box representing one of the unknown space codes 704).

Similar to the positive and negative pairs in the known factor space that are described with respect to, and illustrated in, FIGS. 7-9, the model training system 106 additionally generates the loss function 316 by considering positive and negative pairs in the unknown factor space. In the unknown factor space, a positive image pair is defined as a pair of images that share the same unknown code. For instance, while image pairs 902, 904, and 906 are considered hard negative image pairs in the known factor space by virtue of sharing a common unknown code, image pairs 902, 904, and 906 represent positive image pairs for image 802 in the unknown factor space. A negative image pair in the unknown factor space is defined as a pair of images that each have different unknown codes. In this manner, each positive image pair in the known factor space is necessarily a negative image pair in the unknown factor space. Negative image pairs in the known factor space can also be considered negative image pairs in the unknown factor space. For instance, in the illustrated example 900, image pairs 908, 910, 912, 914, 916, 918, 920, 922, and 924 represent negative image pairs for image 802 in the unknown factor space.

Returning to FIG. 3, the model training system 106 leverages the known space code 216 and unknown space code 218 used to generate each synthesized image 312 and generates the loss function 316 by evaluating similarities between individual pairs of synthesized images 312.

With respect to the known factor latent space, $P_{k,u}$ represents the set of all positive pairs of synthesized images 312 in the known factor latent space and $N_{k,u}$ represents the set of all negative pairs of synthesized images 312 in the known factor latent space. With respect to the unknown factor latent space, $P_{k,u}$ represents the set of all positive pairs of synthesized images 312 in the unknown factor latent space and $N_{k,u}$ represents the set of all negative pairs of synthesized images 312 in the unknown factor latent space. In the notations $P_{k,u}$, $N_{k,u}$, $P_{k,u}$, and $N_{k,u}$, the bolded k or u subscript indicates whether the indicated set of positive or negative images pertains to the known factor or unknown factor latent space.

When training the image generation model 306, because the known space code 216 represents an established image characteristic defined based on the particular known space encoder 210 implemented by the model training system 106, the known space code 216 is useable to control an expected characteristic of the inpainted region of the masked image 304 that results in the synthesized images 312. To force the image generation model 306 to learn correspondences among different known space codes 216, the similarity evaluation module 314 evaluates the similarity between a pair of synthesized images 312 as described in Equation 4.

$$f_{(k,u),(k',u')} = e^{\frac{sim(z_{k,u}z_{k',u'})}{\tau}} \quad \text{(Eq. 4)}$$

In Equation 4, $z_{k,u}$ represents a feature of one of the synthesized images 312 in an image pair and $z_{k',u'}$ represents a feature of the other one of the synthesized images 312 in the image pair, as extracted by the known space encoder 210 used to generate the training dataset 224. In Equation 4, $sim(z_{k,u},z_{k',u'})$ represents the cosine similarity resulting from comparing a pair of synthesized images 312 and $\tau$ denotes a temperature parameter used in the training iteration. Consequently, for a positive pair of synthesized images 312 in the known factor space, the known space contrastive loss 320 is influenced by $\ell_{(k,u),(k,u')}$, as set forth in Equation 5.

$$\ell_{(k,u),(k,u')} = -\log\frac{f_{(k,u),(k,u')}}{f_{(k,u),(k,u')} + FN_{k,u}} \quad \text{(Eq. 5)}$$

As set forth in Equation 5, $FN_{k,u}$ represents the sum of similarity scores of all negative pairs of synthesized images 312 in the known factor space with respect to a given synthesized image 312. For instance, in the illustrated example 900, $FN_{k,u}$ represents the sum of similarity scores for all negative pairs in the known factor space of image 802—the sum of similarity scores computed according to Equation 4 for each of image pairs 902, 904, 906, 908, 910, 912, 914, 916, 918, 920, 922, and 924.

The known space contrastive loss represented by Equation 5 corresponds to contrastive loss computed relative to a given pair of synthesized images 312. Consequently, the known space contrastive loss 320 computed from the synthesized images 312 generated during a training iteration is expressed by Equation 6, where $P_K$ represents all positive pairs of synthesized images 312 in the known factor latent space.

$$\mathcal{L} = \frac{1}{|P_K|}\sum \ell_{(k,u),(k,u')} \quad \text{(Eq. 6)}$$

Thus, the known space contrastive loss 320 represents the summation of contrastive loss computed for all positive pairs of synthesized images 312 in the known factor latent space. With respect to the unknown space contrastive loss 322, the contrastive loss for a synthesized image 312 relative to its positive pair in the unknown factor latent space is expressed by Equation 7.

$$\ell_{(k,u),(k',u)} = -\log\frac{f_{(k,u),(k',u)}}{f_{(k,u),(k',u)} + FN_{k,u}} \quad \text{(Eq. 7)}$$

As noted above, in Equation 7 $FN_{k,u}$ refers to the sum of similarity scores of all negative pairs for an individual synthesized image 312 in the unknown factor latent space. The similarity score for each negative pair of synthesized images 312 in the unknown factor latent space is computed as described above with respect to Equation 4. However, when computing the similarity score with respect to the unknown latent space, $z_{k,u}$ represents a feature of one of the synthesized images 312 in an image pair and $z_{k',u}$ represents a feature of the other one of the synthesized images 312 in the image pair, as extracted by the unknown space encoder 212 used to generate the training dataset 224. Consequently, the unknown space contrastive loss 322 computed from the synthesized images 312 generated during a training iteration is expressed by Equation 8, where $P_U$ represents all positive pairs of synthesized images 312 in the unknown factor latent space.

$$\mathcal{L}_{unknown} = \frac{1}{|P_U|} \sum \ell_{(k,u),(k',u)} \qquad \text{(Eq. 8)}$$

Thus, the unknown space contrastive loss 322 represents the summation of contrastive loss computed for all positive pairs of synthesized images 312 in the unknown factor latent space. In this manner, the model training system 106 is configured to disentangle the latent space representing the training dataset 224 into a known factor latent space using the known space codes 216 and an unknown factor latent space using the unknown space codes 218. For instance, the known factor latent space code corresponds to pre-defined image features extracted using a pretrained encoder that forces the image generation model 306 to synthesize expected image characteristics that can be evaluated relative to one another.

With respect to the unknown factor latent space, the existence of hard negative pairs that share the same unknown space code 218 (e.g., image pairs 902, 904, and 906) enables identifying similarities in the unknown factor latent space among synthesized images 312 having different known space codes 216. Likewise, synthesized images 312 generated from different unknown space codes 218 are understood to depict different image characteristics apart from the known factor. Collectively, this knowledge regarding which known space code 216 and unknown space code 218 influenced generation of a synthesized image 312 enables the model training system 106 to minimize both known space contrastive loss 320 and unknown space contrastive loss 322 during each training iteration.

Overall, the loss function 316 is defined by Equation 9, where $\lambda_1$ represents the weight of the known space contrastive loss 320 and $\lambda_2$ represents the weight of the unknown space contrastive loss 322.

$$\mathcal{L} = \mathcal{L}_{gan} + \lambda_1 \mathcal{L}_{known} + \lambda_2 \mathcal{L}_{unknown} \qquad \text{(Eq. 9)}$$

In implementations, the weights $\lambda_1$ and $\lambda_2$ are initialized based on a type of object depicted by the labeled image 214 in the training dataset 224. For instance, in an example implementation where the training dataset 224 includes labeled images 214 that each depict a human face, $\lambda_1$ is initialized as 1 and $\lambda_2$ is initialized as 0.1. In another example implementation where the training dataset 224 includes labeled images 214 that each depict a car, $\lambda_1$ is initialized as 1 and $\lambda_2$ is initialized as 5. Alternatively or additionally, the weights $\lambda_1$ and $\lambda_2$ are adjusted during training. For instance, in an example training implementation where the model training system 106 trains the image generation model 306 over 200,000 iterations, after the first 100,000 iterations the weights $\lambda_1$ and $\lambda_2$ are each decreased by a factor of 10.

The model training system 106 continues training the image generation model 306 for a plurality of iterations using the loss function 316 to adjust internal weights of the encoder 308 and the decoder 310 (e.g., the convolutional weight 510 of a kernel prior to bi-modulation) for a designated number of iterations and outputs a trained instance of the image generation model 306 as the diverse image inpainting model 324. The diverse image inpainting model 324 is subsequently useable by the image inpainting system 104 to generate one or more synthesized images from a masked input image, such as the input image 108 having a masked region 110 as illustrated in FIG. 1.

In some implementations, the model training system 106 causes the filtering module 222 to filter the training dataset 224 to include a subset of labeled images 214 based on a known space code 216 and an unknown space code 218 associated with the labeled images 214. For instance, the model training system 106 causes the filtering module 222 to filter the training dataset 224 such that the subset of labeled images 214 included in the training dataset 224 includes a hard negative pair in the known factor latent space for each known space code 216 represented in the training dataset 224 and a hard negative pair in the unknown factor latent space for each unknown space code 218 represented in the training dataset 224.

The illustrated example 1000 of FIG. 10 depicts an example subset 1002 of labeled images 214 generated from the image set 706, where the example subset 1002 includes one hard negative pair in the known factor latent space for each known space code 702. The example subset 1002 additionally includes one hard negative pair in the unknown factor latent space for each unknown space code 704. By filtering the image set 706 into a subset 1002 of labeled images included in a training dataset 224 that includes a hard negative pair for each of the represented known and unknown latent space codes, the model training system 106 minimizes a burden on computational resources (e.g., GPU memory) utilized by a computing device implementing the model training system 106 (e.g., the computing device 102).

The training dataset 224 is thus representative of any suitable number of labeled images 214 represented by known space codes 216 and unknown space codes 218 for a predefined type of object depicted in an image. In some implementations, the model training system 106 trains the image generation model 306 to generate the diverse image inpainting model 324 using a training dataset 224 that represents eight known space codes 216 and eight unknown space codes 218. The trained diverse image inpainting model 324 is then useable by the image inpainting system 104 to generate a diverse range of synthesized images from a masked input image 108 while enabling control over an appearance of each generated synthesized image with respect to the known space code 216 used to train the diverse image inpainting model 324.

Figure 11:
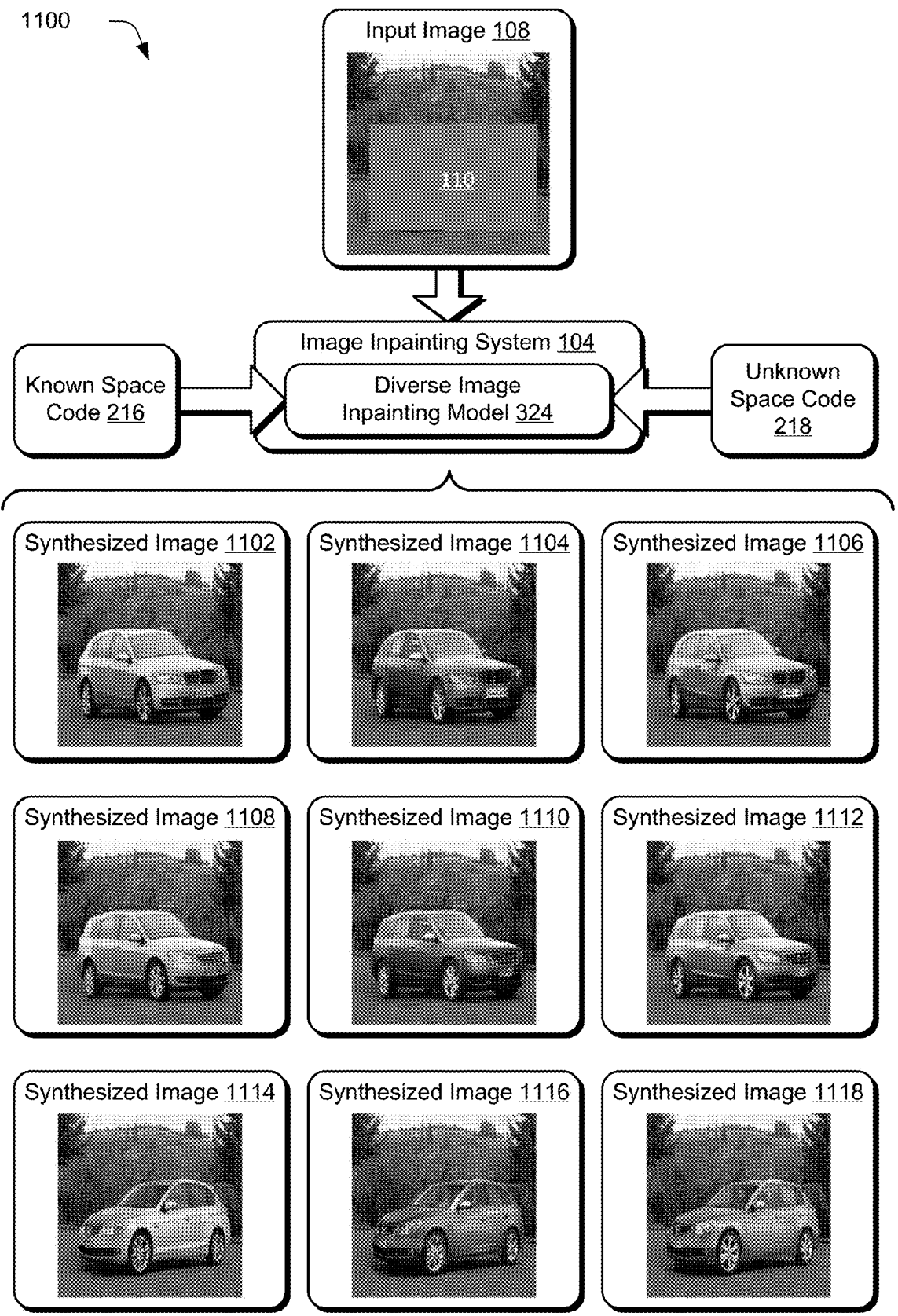
FIG. 11 depicts an example of a diverse range of synthesized images generated by the image inpainting system of FIG. 1 using a masked input image.

FIG. 11 depicts an example 1100 of a diverse range of synthesized images generated from an input image 108 by the image inpainting system 104. Specifically, the image inpainting system 104 implements a diverse image inpainting model trained by the model training system 106 to perform inpainting at a masked region 110 of the input image 108 using at least one known space code 216 and at least one unknown space code 218. In the illustrated example 1100, the diverse image inpainting model 324 is representative of an instance of the image generation model 306 trained to generate an image of a car to fill the masked region 110 of the input image 108 based on the known space codes 216 and unknown space codes 218 used by the model training system 106 during training.

In example implementations, the known space code known space code 216 represents a make and model of the car generated by the diverse image inpainting model 324. Alternatively, the known space code 216 represents a color of the car generated by the diverse image inpainting model 324. Although described with respect to example visual characteristics represented by the known space code 216, the known space code 216 is not so limited to the described example characteristics in accordance with the techniques described herein. As noted above, the unknown space code 218 is representative of image characteristics that influence a visual appearance of the object generated by the diverse image inpainting model 324 apart from the visual characteristics constrained by the known space code 216.

In the example implementation where the known space code 216 represents a make and model of the car, the synthesized images 1102, 1104, and 1106 represent three different synthesized images generated by the diverse image inpainting model 324 using a first known space code 216 and different unknown space codes 218. Similarly, synthesized images 1108, 1110, and 1112 represent a set of synthesized images generated using a second known space code 216 and the set of different unknown space codes 218 used to generate synthesized images 1102, 1104, and 1106. Likewise, the synthesized images 1114, 1116, and 1118 represent a set of synthesized images generated using a third known space code 216 and the set of different unknown space codes 218 used to generate synthesized images 1102, 1104, and 1106 as well as synthesized images 1108, 1110, and 1112. Thus, each of the synthesized images 1102, 1104, 1106, 1108, 1110, 1112, 1114, 1116, and 1118 represents a unique combination of a known space code 216 and an unknown space code 218.

As evidenced by the illustrated example 1100, in the example implementation where the known space code 216 represents a make and model of a car and the unknown space code 218 represents characteristics contributing to an appearance of the car other than its make and model, synthesized images 1102, 1108, and 1114 represent synthesized images generated using a shared first unknown space code 218. Similarly, synthesized images 1104, 1110, and 1116 represent synthesized images generated using a shared second unknown space code 218 that is different from the first unknown space code 218 and synthesized images 1106, 1112, and 1118 represent synthesized images generated using a shared third unknown space code 218 that is different from both the first unknown space code 218 and the second unknown space code 218.

In this manner, the image inpainting system 104 is configured to generate any number of synthesized images from a single masked input image 108 using one or more known space codes 216 and one or more unknown space codes 218. Further, by virtue of bi-modulating the known space code 216 and unknown space code 218 used to generate a particular synthesized image, the image inpainting system 104 enables reliable control over an expected appearance of the inpainted object as constrained by the known space code 216. In some implementations, the image inpainting system 104 generates synthesized images from a masked input image 108 based on user input received at the computing device implementing the image inpainting system 104.

For instance, the illustrated example 1100 depicts an implementation of the image inpainting system 104 generating synthesized images 1102, 1104, 1106, 1108, 1110, 1112, 1114, 1116, and 1118 from the input image 108 based on user input instructing generation of synthesized images using three different known space codes 216 and three different unknown space codes 218. In some implementations, one or more of the known space code 216 or the unknown space code 218 used to generate a synthesized image is randomly sampled by the image inpainting system 104. Alternatively or additionally, one or more of the known space code 216 or the unknown space code 218 used to generate a synthesized image is defined via input to the image inpainting system 104.

For instance, by virtue of the known space code 216 corresponding to an expected visual appearance of the objected generated by the diverse image inpainting model 324, the image inpainting system 104 is configured to generate one or more synthesized images for an image characteristic defined by a known space code 216. As an example, in an implementation where the diverse image inpainting model 324 is trained to generate images depicting human faces by inpainting a masked region 110 of an input image and the known space code 216 represents human identity, the image inpainting system 104 is configured to generate any number of synthesized images depicting a human identity specified via user input.

In this example implementation, a user of the computing device implementing the image inpainting system 104 is enabled to instruct the image inpainting system 104 to generate n synthesized images using a known space code 216 representing the user's identity, where n represents any integer greater than one. Consequently, the image inpainting system 104 is caused to generate n synthesized images depicting the user under different conditions (e.g., under different lighting conditions, as having different skin tones, as having different facial expressions, as having different poses, and so forth). In some implementations, each synthesized image generated by the image inpainting system 104 is output with an indication of the known space code 216 and the unknown space code 218 used to generate the synthesized image.

Continuing the example implementation where the diverse image inpainting model 324 is configured to generate images depicting human faces, by outputting synthesized images with an indication of the known space code 216 and unknown space code 218 used in generation, the image inpainting system 104 enables a user to designate specific latent space codes for use in generating an additional synthesized image. For instance, an unknown space code 218 depicting a certain individual as having a combination of facial expressions, pose, lighting conditions, and so forth is identifiable and useable to instruct the image inpainting system 104 to generate a synthesized image depicting a different individual (e.g., human identity) identified by a different known space code 216 as having the same combination of facial expressions, pose, lighting conditions, and so forth defined by the unknown space code 218.

The techniques described herein thus enable control over generating different synthesized images with respect to one or more predefined image characteristics and generation of synthesized images exhibiting diverse ranges of image characteristics that is not possible using conventional image inpainting systems and approaches.

Having considered example systems and techniques, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-11.

Figure 12:
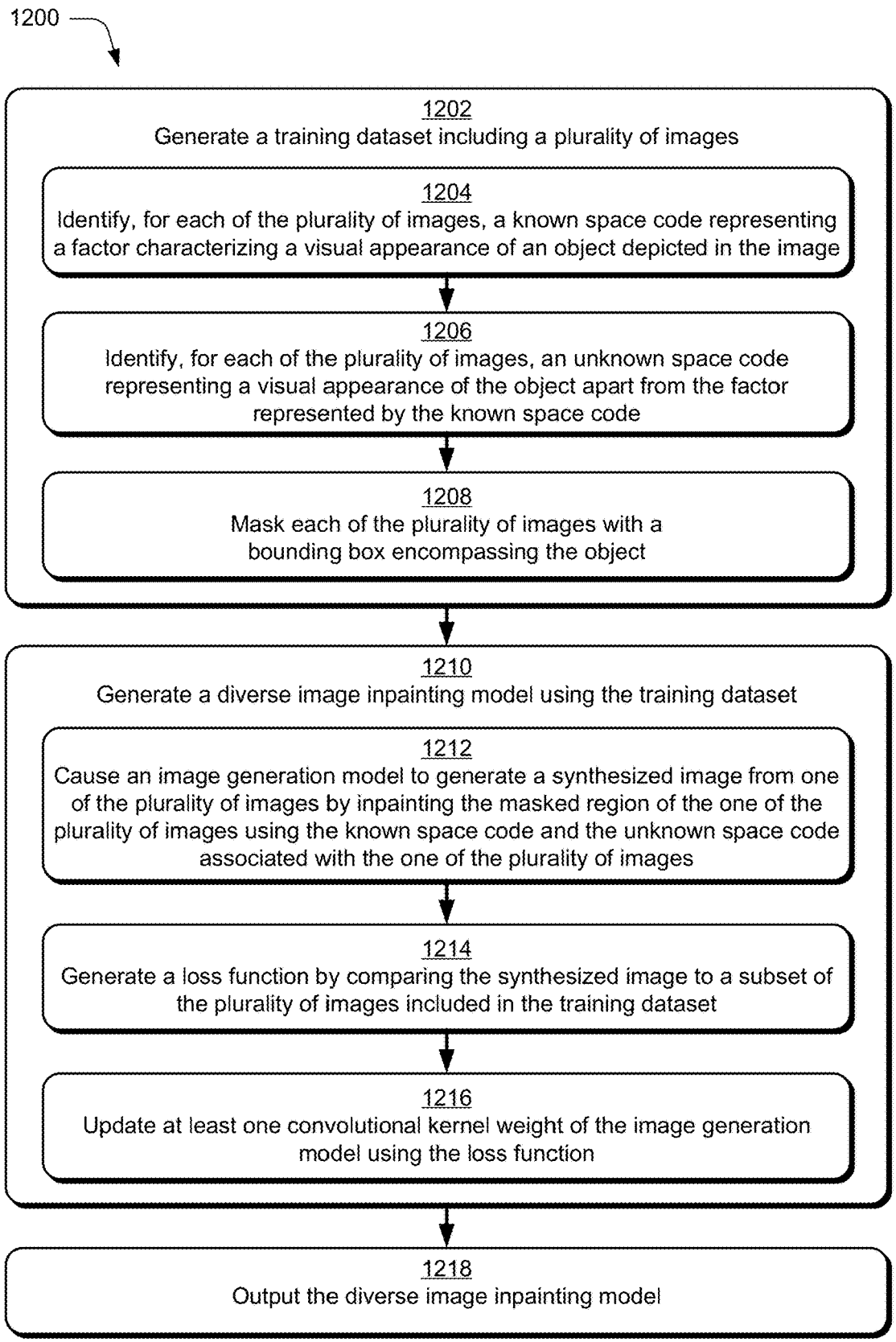
FIG. 12 is a flow diagram depicting a procedure in an example implementation of training a diverse image inpainting model using the techniques described herein.

FIG. 12 is a flow diagram depicting a procedure 1200 in an example implementation of training a diverse image inpainting model using the techniques described herein. A training dataset including a plurality of images is generated (block 1202). To do so, a known space code representing a factor characterizing a visual appearance of an object depicted in an image is identified for each of the plurality of images included in the training dataset (block 1204). The labeling module 206, for instance, processes each image 204 included in the image dataset 202 using a known space encoder 210 to identify a known space code 216 for an object depicted in the image 204.

As part of generating the training dataset, an unknown space code representing a visual appearance of the object apart from the factor represented by the known space code is identified for each of the plurality of images included in the training dataset (block 1206). The labeling module 206, for instance, processes each image 204 included in the 202 using an unknown space encoder 212 to identify an unknown space code 218 for the object depicted in the image 204. Generating the training dataset further involves masking each of the plurality of images with a bounding box encompassing the object depicted in the image (block 1208). The labeling module 206, for instance, implements an object recognition model 208 to identify the object depicted in the image 204 and generate a mask region 220 defining a bounding box surrounding the object. The masking module 302 uses the mask region 220 to generate a masked image 304 for each labeled image 214.

A diverse image inpainting model is generated using the training dataset (block 1210). As part of generating the diverse image inpainting model, an image generation model is caused to generate a synthesized image from one of the plurality of images by inpainting the masked region of the one of the plurality of images using the known space code and the unknown space code associated with the one of the plurality of images (block 1212). The model training system 106, for instance, provides a masked image 304 as input to image generation model 306 together with a known space code 216 and an unknown space code 218 and causes the image generation model 306 to generate synthesized image 312.

A loss function is generated by comparing the synthesized image to a subset of the plurality of images included in the training dataset (block 1214). The model training system 106, for instance, generates loss function 316 to include GAN loss 318, known space contrastive loss 320, and unknown space contrastive loss 322. The model training system 106 determines the known space contrastive loss 320 and the unknown space contrastive loss 322 by computing an image similarity score of the synthesized image 312 relative to individual ones of the labeled images 214 included in the training dataset 224 that serve as positive pairs or negative pairs to the synthesized image 312 in both the known factor latent space and the unknown factor latent space.

At least one convolutional kernel weight of the image generation model is updated using the loss function (block 1216). The model training system 106, for instance, applies the loss function 316 to the image generation model 306 to update the convolutional weight 510 of one or more convolutional layers of the encoder 308 and/or the decoder 310 of the image generation model 306. In some implementations, a single training iteration involved in generating the diverse image inpainting model involves performing operations set forth in blocks 1212, 1214, and 1216 for each labeled image 214 included in a training dataset 224 and performing a threshold number of training iterations.

The diverse image inpainting model is then output (block 1218). The model training system 106, for instance, outputs the diverse image inpainting model 324 for use by the image inpainting system 104 responsive to completing a threshold number of training iterations.

Figure 13:
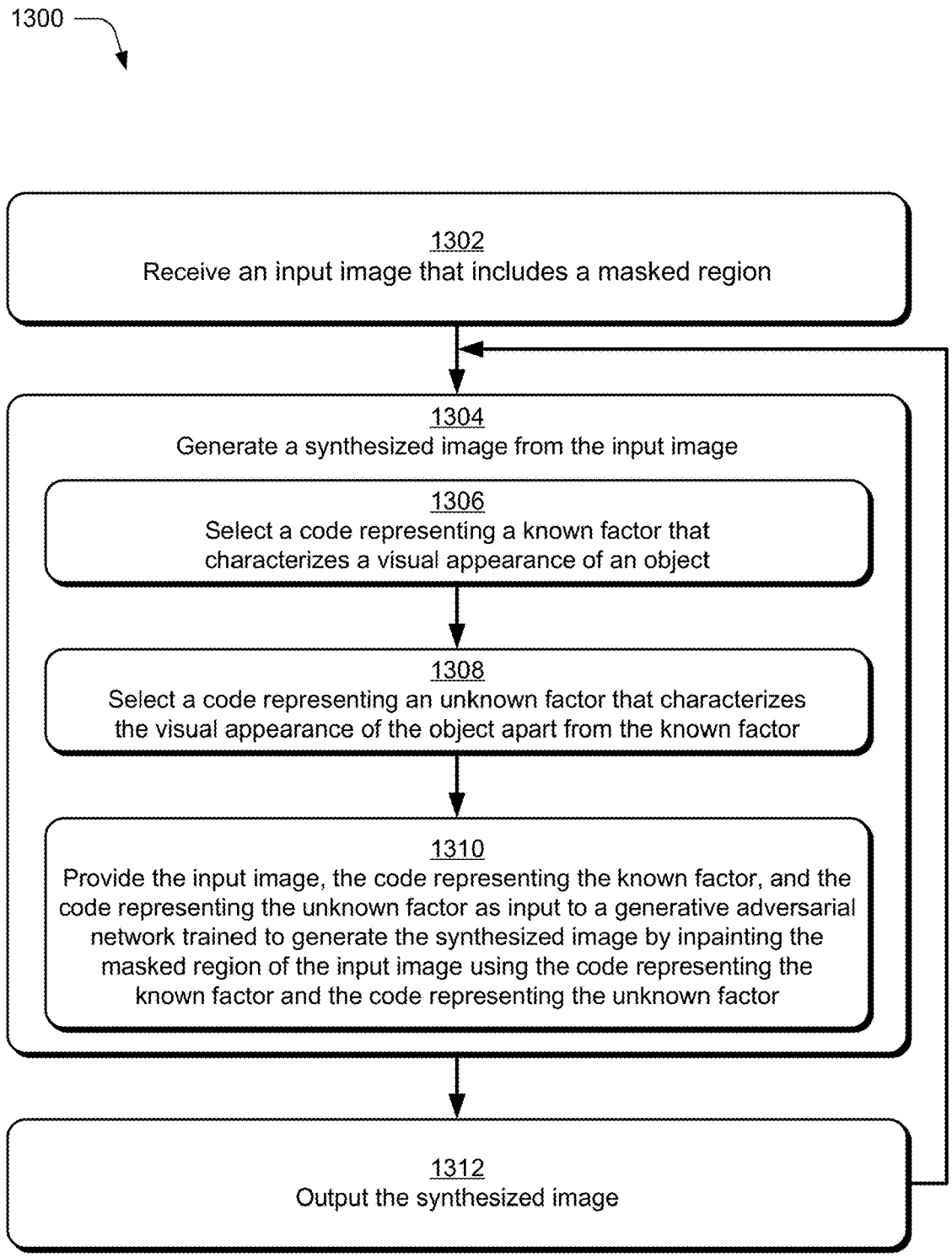
FIG. 13 is a flow diagram depicting a procedure in an example implementation of generating a diverse range of synthesized images using the techniques described herein.

FIG. 13 is a flow diagram depicting a procedure 1300 in an example implementation of generating a diverse range of synthesized images using the techniques described herein. An input image that includes a masked region is received (block 1302). The image inpainting system 104, for instance, receives input image 108 with masked region 110.

A synthesized image is generated from the input image (block 1304). As part of generating the synthesized image, a code representing a known factor that characterizes a visual appearance of an object is selected (block 1306). The image inpainting system 104, for instance, selects a known space code 216 for the diverse image inpainting model 324. A code representing an unknown factor that characterizes the visual appearance of the object apart from the known factor is additionally selected (block 1308). The image inpainting system 104, for instance, selects an unknown space code 218 for the diverse image inpainting model 324.

The input image, the code representing the known factor, and the code representing the unknown factor are provided as input to a generative adversarial network trained to generate the synthesized image by inpainting the masked region of the input image using the code representing the known factor and the code representing the unknown factor (block 1310). The image inpainting system 104, for instance, provides the input image 108 with the masked region 110, the known space code 216, and the unknown space code 218 as input to the diverse image inpainting model 324. While the diverse image inpainting model 324 generates a synthesized image from these inputs, the image inpainting system 104 causes the diverse image inpainting model 324 to bi-modulate convolutional layer weights for both an encoder 308 and a decoder 310.

The synthesized image is then output (block 1312). The image inpainting system 104, for instance, causes the diverse image inpainting model 324 to output synthesized image 1102. In some implementations, a plurality of diverse synthesized images are generated from the same input image including the masked region, as represented by the arrow returning to block 1304 from block 1312. The image inpainting system 104, for instance, generates a plurality of synthesized images 1102, 1104, 1106, 1108, 1110, 1112, 1114, 1116, and 1118 using a unique combination of a known space code 216 and an unknown space code 218 for each of the plurality of synthesized images.

Having described example procedures in accordance with one or more implementations, consider now an example system and device to implement the various techniques described herein.

Example System and Device

Figure 14:
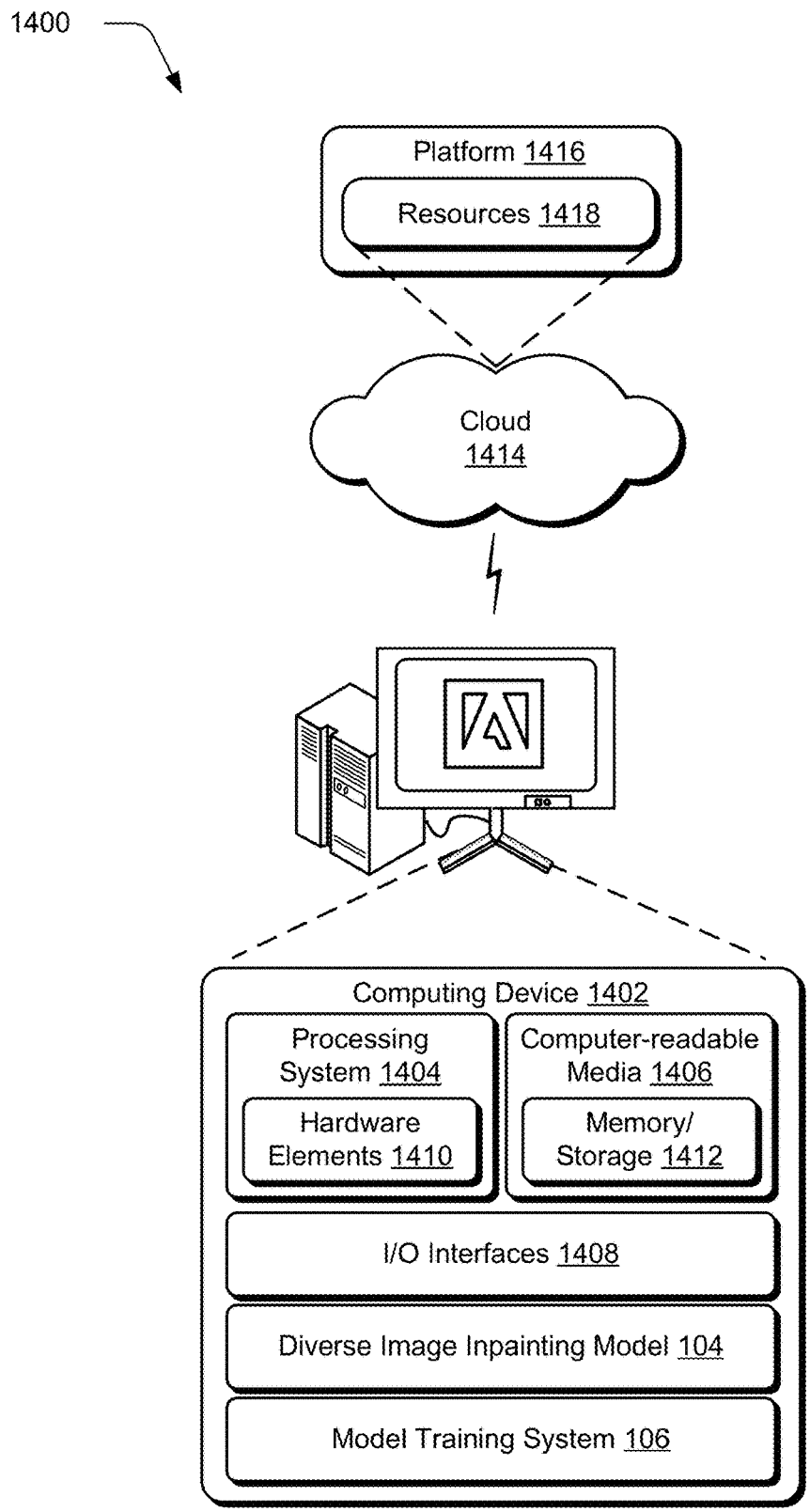
FIG. 14 illustrates an example system including various components of an example device to implement the techniques described with reference to FIGS. 1-13.

FIG. 14 illustrates an example system 1400 that includes an example computing device 1402, which is representative of one or more computing systems and/or devices that implement the various techniques described herein. This is illustrated through inclusion of the image inpainting system 104 and the model training system 106. The computing device 1402 is configured, for example, as a service provider server, as a device associated with a client (e.g., a client device), as an on-chip system, and/or as any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that are configurable as processors, functional blocks, and so forth. For instance, hardware element 1410 is implemented in hardware as an application specific integrated circuit or other logic device formed using one or more semiconductors. The hardware elements 1410 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 1406 is illustrated as including memory/storage 1412. The memory/storage 1412 represents memory/storage capacity associated with one or more computer-readable media. The memory/storage 1412 is representative of volatile media (such as random-access memory (RAM)) and/or nonvolatile media (such as read only memory (ROM), Flash memory, optical disks, magnetic disks, and so forth). The memory/storage 1412 is configured to include fixed media (e.g., RAM, ROM, a fixed hard drive, and so on) as well as removable media (e.g., Flash memory, a removable hard drive, an optical disc, and so forth). In certain implementations, the computer-readable media 1406 is configured in a variety of other ways as further described below.

Input/output interface(s) 1408 are representative of functionality to allow a user to enter commands and information to computing device 1402 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 1402, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. This functionality is further configured to be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that is utilized while computer processing is executed on servers that are remote from the computing device 1402. Resources 1418 also include services provided over the Internet and/or through a subscriber network, such as a cellular or Wi-Fi network.

The platform 1416 is configured to abstract resources and functions to connect the computing device 1402 with other computing devices. The platform 1416 is further configured to abstract scaling of resources to provide a corresponding level of scale to encountered demand for the resources 1418 that are implemented via the platform 1416. Accordingly, in an interconnected device embodiment, implementation of functionality described herein is configured for distribution throughout the system 1400. For example, in some configurations the functionality is implemented in part on the computing device 1402 as well as via the platform 1416 that abstracts the functionality of the cloud 1414.

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:
  receiving an input image that includes a masked region;
  generating a synthesized image from the input image by:
    selecting a code representing a known factor that characterizes a visual appearance of an object;
    selecting a code representing an unknown factor that characterizes the visual appearance of the object apart from the known factor; and
    providing the input image, the code representing the known factor, and the code representing the unknown factor as input to a generative adversarial network that includes an encoder portion and is trained to generate the synthesized image by:
      bi-modulating a kernel weight of each convolutional layer included in the encoder portion using the code representing the known factor and the code representing the unknown factor; and
      inpainting the masked region of the input image using the code representing the known factor and the code representing the unknown factor; and
  outputting the synthesized image.

2. The method of claim 1, wherein the generative adversarial network includes a decoder portion and the generative adversarial network is trained to generate the synthesized image by bi-modulating a kernel weight of each convolutional layer included in the decoder portion using the code representing the known factor and the code representing the unknown factor.

3. The method of claim 1, wherein the masked region comprises a box that visually obscures an object that is defined by an object type and otherwise depicted in the input image and the synthesized image depicts a different version of the object type.

4. The method of claim 1, further comprising generating a plurality of synthesized images from the input image, each of the plurality of synthesized images being generated using a unique combination of codes representing the known factor that characterizes the visual appearance of the object and the unknown factor that characterizes the visual appearance of the object apart from the known factor.

5. The method of claim 1, wherein selecting the code representing the known factor that characterizes the visual appearance of the object is performed responsive to receiving user input defining the code representing the known factor.

6. The method of claim 1, wherein selecting the code representing the unknown factor that characterizes the visual appearance of the object apart from the known factor is performed responsive to receiving user input defining the code representing the unknown factor.

7. The method of claim 1, wherein the generative adversarial network is trained using known space contrastive loss computed based on similarities between image characteristics contributing to the visual appearance of the object represented by the known factor.

8. The method of claim 7, wherein the known space contrastive loss is computed during training of the generative adversarial network by:
  computing a score representing an image similarity between a training synthesized image and an image in a training dataset sharing a known factor with the training synthesized image; and
  computing a summation of image similarity scores, each of the image similarity scores being computed by comparing the training synthesized image to an image in the training dataset associated with a different unknown factor than the training synthesized image.

9. The method of claim 1, wherein the generative adversarial network is trained using unknown space contrastive loss computed based on similarities between image characteristics contributing to the visual appearance of the object apart from image characteristics represented by the known factor.

10. The method of claim 9, wherein the unknown space contrastive loss is computed during training of the generative adversarial network by:
  computing a score representing an image similarity between a training synthesized image and an image in a training dataset sharing an unknown factor with the training synthesized image; and computing a summation of image similarity scores, each of the image similarity scores being computed by comparing the training synthesized image to an image in the training dataset associated with a different known factor than the training synthesized image.

11. The method of claim 1, wherein the generative adversarial network is trained to generate the synthesized image by inpainting a human face at the masked region of the input image and the known factor specifies an identity of the human face or a facial expression of the human face.

12. The method of claim 1, wherein the generative adversarial network is trained to generate the synthesized image by inpainting a bird at the masked region of the input image and the known factor specifies a species of the bird or a coloring of the bird.

13. The method of claim 1, wherein the generative adversarial network is trained to generate the synthesized image by inpainting a car at the masked region of the input image and the known factor specifies a shape of the car or a color of the car.

14. A system comprising:
a memory component; and
a processing device coupled to the memory component, the processing device to perform operations comprising:
receiving a training dataset that includes a plurality of images, each of the plurality of images including a masked region, a known space code representing a factor that characterizes a visual appearance of an object otherwise depicted in the masked region, and an unknown space code representing a visual appearance of the object apart from the factor that characterizes the visual appearance of the object;
generating a diverse image inpainting model by performing, for each of a plurality of training iterations:
causing an image generation model that includes a generative adversarial network to generate a synthesized image from one of the plurality of images by:
bi-modulating a convolutional kernel of at least one convolutional layer included in the generative adversarial network using the known space code and the unknown space code; and
inpainting the masked region of the one of the plurality of images to depict an object using the known space code and the unknown space code associated with the one of the plurality of images;
generating a loss function by comparing the synthesized image to a subset of the plurality of images included in the training dataset; and
adjusting at least one convolutional kernel weight of the image generation model using the loss function; and
outputting the diverse image inpainting model responsive to performing the plurality of training iterations.

15. The system of claim 14, wherein the loss function includes a known space contrastive loss, the operations further comprising generating the known space contrastive loss by:
computing a score representing an image similarity between the synthesized image and one of the plurality of images in the training dataset that shares the known space code; and computing a summation of image similarity scores, each of the image similarity scores being computed by comparing the synthesized image to one of the plurality of images in the training dataset associated with a different unknown space code than the synthesized image.

16. The system of claim 14, wherein the loss function includes an unknown space contrastive loss, the operations further comprising generating the unknown space contrastive loss by:
computing a score representing an image similarity between the synthesized image and one of the plurality of images in the training dataset that shares the unknown space code; and
computing a summation of image similarity scores, each of the image similarity scores being computed by comparing the synthesized image to one of the plurality of images in the training dataset associated with a different known space code than the synthesized image.

17. The system of claim 14, the operations further comprising generating a plurality of synthesized images using the diverse image inpainting model by providing a single masked input image as input to the diverse image inpainting model.

18. A method comprising:
generating a diverse image inpainting model by performing, for each of a plurality of training iterations:
causing an image generation model that includes an encoder portion to generate a synthesized image from one of a plurality of images included in a training dataset by:
inpainting a masked region of the one of the plurality of images to depict an object using a known space code representing a factor that characterizes a visual appearance of an object otherwise depicted in the masked region and an unknown space code representing a visual appearance of the object apart from the factor that characterizes the visual appearance of the object; and
bi-modulating a convolutional kernel of each convolutional layer included in the encoder portion using the known space code and the unknown space code;
generating a loss function by comparing the synthesized image to a subset of the plurality of images included in the training dataset; and
adjusting at least one convolutional kernel weight of the image generation model using the loss function;
outputting the diverse image inpainting model responsive to performing the plurality of training iterations; and
causing the diverse image inpainting model to generate a plurality of synthesized images by inputting an image that includes a masked region to the diverse image inpainting model and specifying a known space code to use in the plurality of synthesized images, each of the plurality of synthesized images being different from one another.

19. The method of claim 18, wherein the image generation model includes a decoder portion and is trained to generate the synthesized image by bi-modulating a kernel weight of each convolutional layer included in the decoder portion using the known space code and the unknown space code.

20. The method of claim 18, wherein the masked region of the image comprises a visually obscured object defined by an object type and each of the plurality of synthesized images depicts a different version of the object type.

* * * * *